United States Patent
Zhao et al.

(10) Patent No.: US 12,523,970 B2
(45) Date of Patent: Jan. 13, 2026

(54) SYSTEM AND METHOD FOR BUILDING AND DEPLOYING A SUSTAINABLE DYNAMIC REDUCED-ORDER MODEL (SDROM) FOR AN INDUSTRIAL PROCESS

(71) Applicant: AspenTech Corporation, Bedford, MA (US)

(72) Inventors: Hong Zhao, Sugar Land, TX (US); Christopher Quan, Somerville, MA (US); Shu Wang, Lexington, MA (US); Melisa Morales Cárdenas, Mexico City (MX)

(73) Assignee: AspenTech Corporation, Bedford, MA (US)

( * ) Notice: Subject to any disclaimer, the term of this patent is extended or adjusted under 35 U.S.C. 154(b) by 762 days.

(21) Appl. No.: 17/810,169

(22) Filed: Jun. 30, 2022

(65) Prior Publication Data

US 2024/0004356 A1    Jan. 4, 2024

(51) Int. Cl.
*G05B 13/04* (2006.01)
*G05B 13/02* (2006.01)

(52) U.S. Cl.
CPC ....... *G05B 13/048* (2013.01); *G05B 13/0265* (2013.01)

(58) Field of Classification Search
CPC .. G05B 13/048; G05B 13/0265; G05B 11/32; G05B 13/042; G05B 17/02; G05B 19/41885

See application file for complete search history.

(56) References Cited

U.S. PATENT DOCUMENTS

| | | | |
|---|---|---|---|
| 9,141,911 B2 | 9/2015 | Zhao et al. |
| 9,727,035 B2 | 8/2017 | Keenan et al. |
| 10,698,372 B2 | 6/2020 | Zhao et al. |
| 2005/0149209 A1 | 7/2005 | Wojsznis et al. |

(Continued)

FOREIGN PATENT DOCUMENTS

WO    2024/006873 A1    1/2024

OTHER PUBLICATIONS

Gibbs, B. P., et al., "Application of nonlinear model-based predictive control to fossil power plants", Proceedings of the 30th IEEE Conference on Decision and Control, Dec. 11-13, 1991, pp. 1850-1856.

(Continued)

*Primary Examiner* — Charles R Kasenge
(74) *Attorney, Agent, or Firm* — Hamilton, Brook, Smith & Reynolds, P.C.

(57) ABSTRACT

Embodiments of the present disclosure provide functionality for creating a sustainable dynamic reduced-order model (SDROM) for operating a real-world industrial process. The model is based upon a reduced order model (ROM) trained using data obtained from simulations performed using a first-principles model (FPM) of the real-world industrial process. The trained ROM is divided into multiple-input, single-output (MISO) sub-models, which are partitioned into component terms for incorporation of respective gain factors. The SDROM is deployed online to operate the real-world industrial process with one or more optimization objectives and the SDROM is periodically calibrated and validated using historical operation data.

20 Claims, 20 Drawing Sheets

(56) References Cited

U.S. PATENT DOCUMENTS

2011/0130850 A1    6/2011   Zheng et al.
2016/0320768 A1*   11/2016   Zhao .................... G05B 19/406
2020/0387818 A1    12/2020   Chan et al.

OTHER PUBLICATIONS

International Search Report and Written Opinion received for PCT Patent Application No. PCT/US2023/069321, mailed on Oct. 16, 2023, 14 pages.
Enns, "Model Reduction for Control System Design," NASA Contractor Report 170417, Mar. 1985.

* cited by examiner

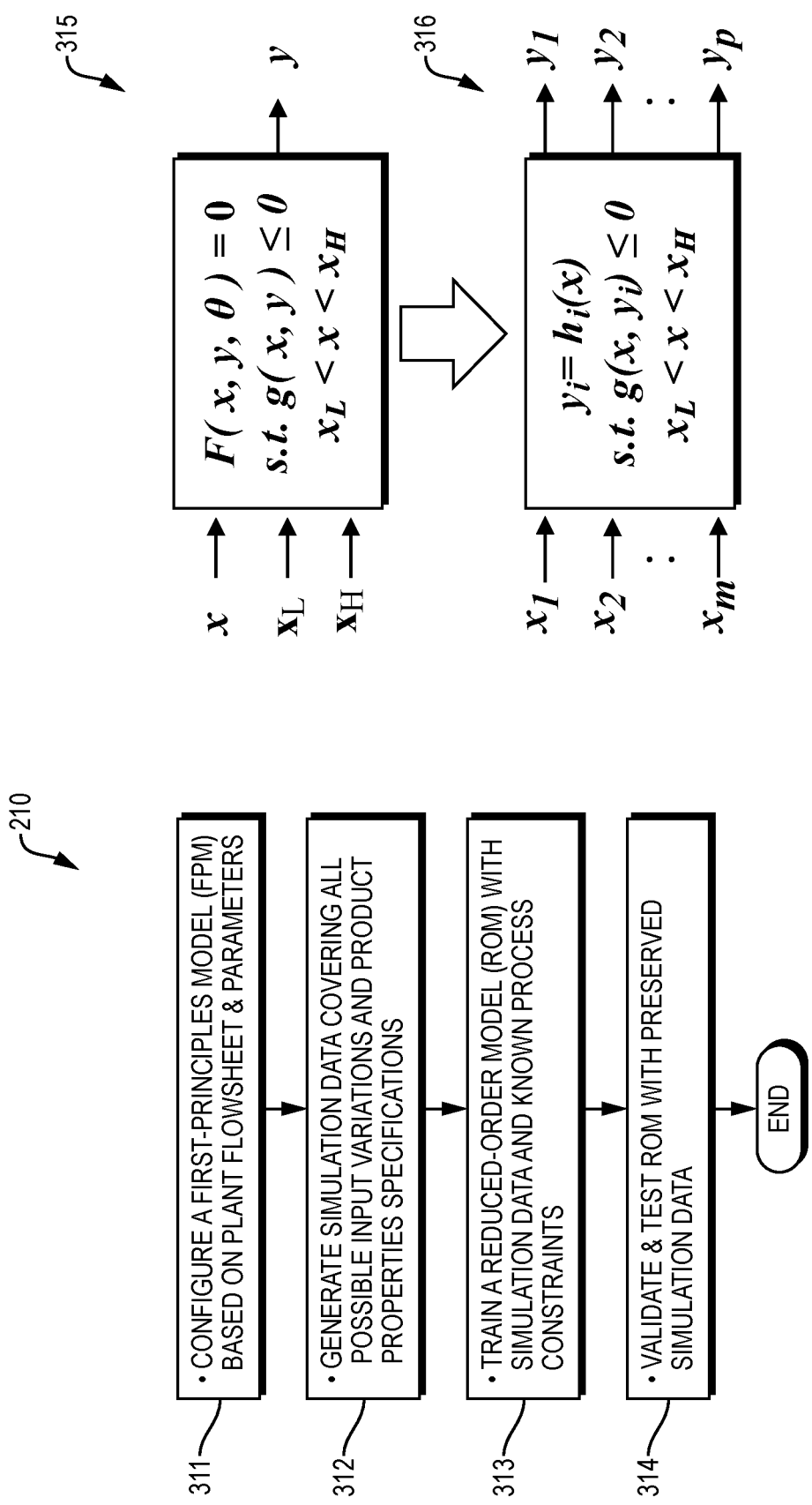

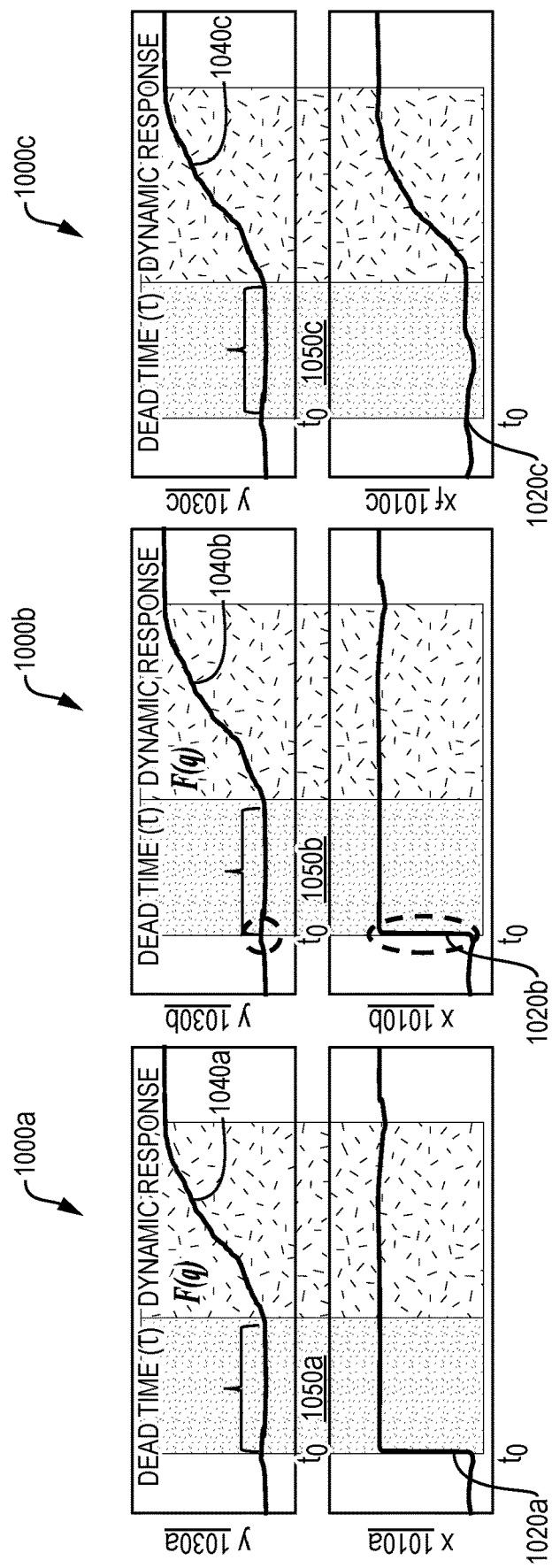

R09_LCN_FLOW — 1100a

| | R² | | Parameter Drift / Model Performance | | | |
|---|---|---|---|---|---|---|
| ROM | SDROM | Total | Good | Okay | Poor | Bad |
| 0.044 | 0.68 | 18 | | 1 | 2 | 6 | 11 |

1110a

R32_HCN_PARAFFINS

| | R² | | Parameter Drift / Model Performance | | | |
|---|---|---|---|---|---|---|
| ROM | SDROM | Total | Good | Okay | Poor | Bad |
| 0.30 | 0.98 | 14 | 12 | 1 | 1 | 0 |

1120a

R40_HCNLCOSWING_RON

| | R² | | Parameter Drift / Model Performance | | | |
|---|---|---|---|---|---|---|
| ROM | SDROM | Total | Good | Okay | Poor | Bad |
| 0.79 | 1.00 | 14 | 14 | 0 | 0 | 0 |

1130a

R44_HCNLCOSWING_NAPHTHENES

| | R² | | Parameter Drift / Model Performance | | | |
|---|---|---|---|---|---|---|
| ROM | SDROM | Total | Good | Okay | Poor | Bad |
| 0.025 | 0.98 | 23 | 15 | 0 | 6 | 2 |

1140a

Legend:
- GOOD MATCH - <30% ROM COEFFICIENT CHANGE
- OKAY MATCH - <50% ROM COEFFICIENT CHANGE
- POOR MATCH - <100% ROM COEFFICIENT CHANGE
- BAD MATCH - >100% OR SIGN CHANGE
- NO ROM COEFFICIENT

FIG. 11A

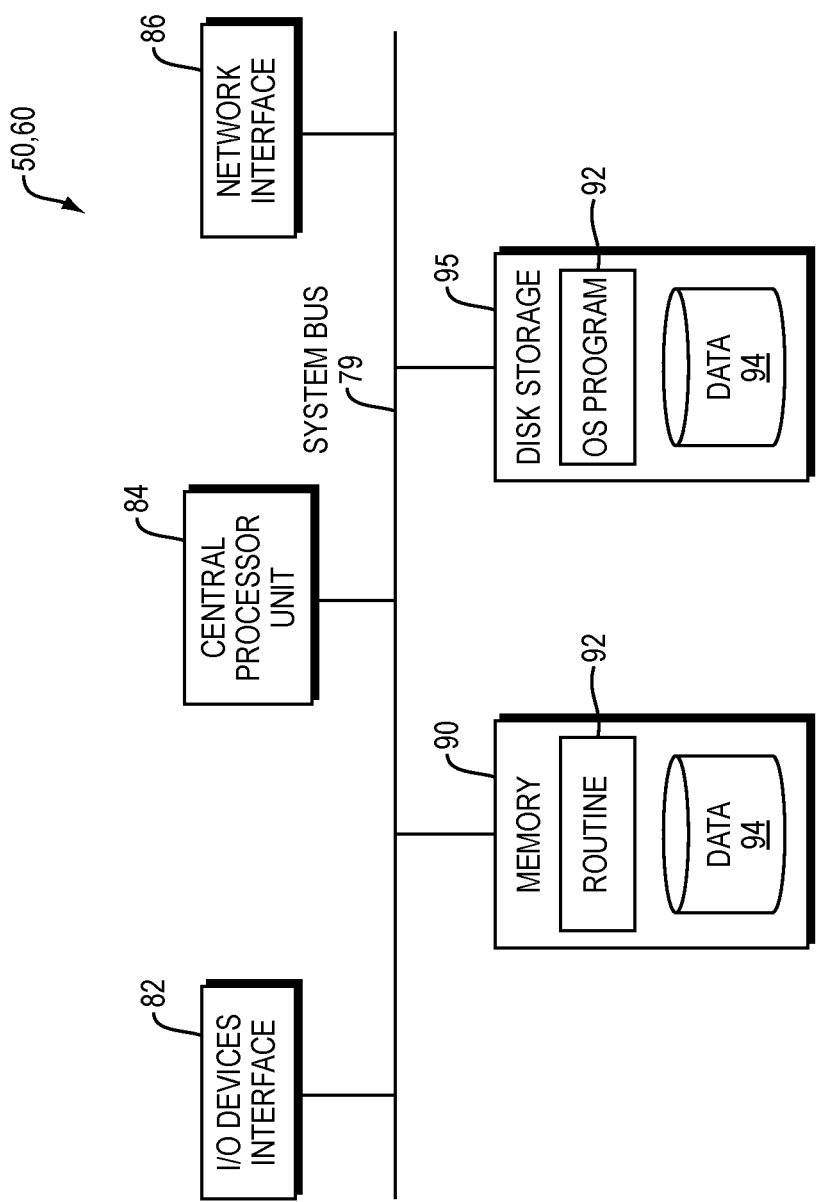

SYSTEM AND METHOD FOR BUILDING AND DEPLOYING A SUSTAINABLE DYNAMIC REDUCED-ORDER MODEL (SDROM) FOR AN INDUSTRIAL PROCESS

BACKGROUND

In process manufacturing industries, advanced process control (APC), real-time optimization (RTO) of plant-wide operations, and plant supply chain planning and scheduling have historically been primary tools for manufacturing concerns, such as refineries and petrochemical plants, to maximize economic margins while operating amid a variable market. In the past three decades, APC has matured and been applied widely. As an example application of APC, model predictive control (MPC) technology has become an industrial standard in process manufacturing industries. For instance, more than 8,000 dynamic matrix control (DMC) implementations of MPC, including implementations of DMCPlus and DMC3, are already in service in process manufacturing facilities across the world. RTO technology, which operates on top of an APC layer, employs complex nonlinear models of an underlying process, thus working together with APC to find optimal conditions and to drive process operation continuously to those optimal conditions, while adapting to environmental changes and adjustments to economic targets.

SUMMARY

However, in today's industrial practices, several technical challenges remain, rendering sustainable performance of an RTO system difficult to achieve.

(1) Such challenges include a reliance of RTO system performance on the accuracy of a process model, which can be a full-scale first-principles model, a reduced-order model, a data-driven linear regression model, a black-box neural network model, or another type of process model. In industrial applications, any such model may degrade with time due to inevitable changes in the underlying subject process, such as equipment modifications, changes in operating strategy, feed rate and quality changes, de-bottlenecking, instrumentation degradation, and the like. Such model degradation results in loss of benefits of an RTO system. To sustain good RTO performance, the model's predictive quality needs to be monitored, and the model needs to be periodically audited and updated when necessary.

(2) Secondly, it is a challenging and resource-intensive task to pinpoint a problematic sub-model in an RTO system and to build a new model or sub-model to repair or replace its malfunctioning counterpart. In a large-scale RTO application, hundreds of variables, or more, may be involved. Collecting data and re-building a model may take engineering experts several weeks to several months of intensive efforts, and may cause significant interruptions and profit loss as well. Practically, often only a subset of the model is to blame for RTO performance degradation in many applications. Techniques for identifying, measuring, isolating, and then updating those subsets of a plant model in a timely manner are sought. A subset of a model may herein be referred to interchangeably as a "submodel."

(3) In many existing solutions, a full-scale first-principles model (FPM), or a reduced-order model (ROM) derived therefrom, is based on a large set of complex static nonlinear equations in a closed form, for example, $f(X, Y)=0$, where $X=[x_1, x_2, \ldots, x_r]$, and $Y=[y_1, y_2, \ldots, y_m]$ are an input variable vector and an output variable vector, respectively. In online applications, a special procedure called "Steady-State Detection" (SSD) may need to be in place to check process conditions to ensure that a subject process has reached or has been at a stable, steady-state operating point. This is because a significant transition of such an operating point may not satisfy pre-defined assumptions that may have been applied to FPM/ROM model equations. In many such cases, an RTO system will have to wait for a long time to ensure sufficient settling following the operating point transition. Such a SSD condition may thus render a large amount of plant sensor data invalid until a specified process "steady-state" is determined to have been reached by satisfaction of a SSD criterion. On the other hand, regularly available plant data from sensor measurements are dynamic time-series. Therefore, any unaligned time-delays between FPM/ROM inputs and outputs may negatively impact model prediction accuracy. Furthermore, given that current industrial plants often operate with highly energy-integrated design, and under more flexible operational schedules due to fast market changes, true steady-state conditions are often difficult to reach. Therefore, traditional approaches often require a long "waiting" time period before a process moving decision can be made and subsequently implemented. Consequently, a large amount of dynamic plant data may be unable to be used in an FPM for optimization. Additionally, the resulting delays in decision-making may contribute to suboptimal plant operation, in turn leading to profit loss and/or reductions in margins.

The embodiments described herein addresses the aforementioned technical challenges and provide process manufacturing entities with an innovative and efficient solution.

According to an aspect of the present disclosure, a computer-implemented method of creating a model for operating a real-world industrial process is described. Such operating may be performed for production optimization of the real-world industrial process. The method includes training a ROM of a subject industrial process using simulation data generated from one or more simulations of the subject industrial process performed using a FPM of the subject industrial process. The method further includes constructing a sustainable dynamic reduced-order model (SDROM) of the subject industrial process by (i) dividing the trained ROM into a plurality of multiple-input single-output (MISO) sub-models, (ii) partitioning each MISO sub-model into multiple component terms; and (iii) inserting a gain factor into each partitioned component term to form a gain vector for each MISO sub-model. The method further includes deploying the SDROM online to operate the subject industrial process.

Deploying the SDROM online may include obtaining operation data of the subject industrial process, and periodically calibrating and validating the deployed SDROM using the obtained operation data. In turn, periodically calibrating and validating the deployed SDROM may include monitoring a given MISO sub-model of the plurality of MISO sub-models. Such monitoring may include (i) retrieving historical operation data from a plant history database, (ii) filtering elements of the retrieved historical operation data with a dynamic filter attached to a given input of the given MISO sub-model, (iii) wherein the gain vector formed for the given MISO sub-model is a first gain vector, estimating gain factors of a second gain vector of the given MISO sub-model based on the filtered elements of the retrieved historical operation data, (iv) comparing the estimated gain factors of the second gain vector with inserted gain factors of the first gain vector to determine model performance metrics, and (v) displaying, to users, a visual representation of the determined model performance metrics. It should be noted that the historical operation data referenced herein may be the operation data previously referred to with reference to deployment of the SDROM online, or may be separate set or sets of data.

Alternatively, or in addition, periodically calibrating and validating the constructed SDROM may include adapting a given MISO sub-model of the plurality of MISO sub-models of the constructed SDROM with historical operation data of the subject industrial process by receiving allowance to perform adaptations to at least a part of the given MISO sub-model of the constructed SDROM from a user or an auto-system, and updating the given MISO sub-model by calibrating gain factors of the given MISO sub-model. As referred to herein, historical operation data may be a subset of the operation data previously introduced herein, or may be separate. Additionally, historical operation data may draw greater relevance from being associated with a relatively recent time period. Such recent historical operation data may also be referred to as fresh historical operation data. Fresh historical operation data as such, depending at least upon a particular industrial process in which the method is performed, may correspond to, for example, a period of one minute, one hour, one day, one week, or another window of time preceding, and possibly inclusive of, the time of obtention of said data.

Updating the given MISO sub-model by calibrating gain factors of the given MISO sub-model, as introduced hereinabove, may include retrieving the historical operation data, as a time-series or as a set thereof, from a plant history database, for a window of time represented within the plant history database. Updating the given MISO sub-model may further include filtering elements of the retrieved historical operation data with a dynamic filter attached to a given input of the given MISO sub-model. Updating the given MISO sub-model may further include feeding the filtered elements of the retrieved historical operation data as inputs into the given MISO sub-model and predicting an output time-series corresponding to the filtered elements. Updating the given MISO sub-model may further include comparing the predicted output with the retrieved historical operation data of the subject industrial process output in R 2 statistics, and adjusting, according to the comparing, and subject to one or more suppression constraints, values of the gain factors for the given input of the given MISO sub-model, thereby calibrating the gain factors of the given MISO sub-model. Updating the given MISO sub-model may further include updating the SDROM to include the given MISO sub-model with the calibrated gain factors, and validating the updated SDROM with the testing dataset.

In some aspects of the method, deploying the SDROM online includes receiving a stream of real-time data of the subject industrial process, filtering elements of the received stream of real-time data with a dynamic filter attached to a given input of a given MISO sub-model predicting an output of the given MISO sub-model and estimating local gains of the given MISO sub-model around an updated operating point determined from the filtered elements of the received stream of real-time data, and determining optimal operation settings of the subject industrial process based on the predicted output and estimated local gains.

Alternatively, or in addition, deploying the SDROM online may include determining optimal operation settings of the subject industrial process using the SDROM and an optimization objective function. The optimal operation settings may include at least one of a temperature setpoint, a pressure setpoint, a flow rate setpoint, an operating throughput, and a transition path from a current operating state to the determined optimal operation settings, amongst other examples. Deploying the SDROM online may further include operating the subject industrial process in accordance with the determined optimal operation settings.

In some aspects of the method, constructing the SDROM includes attaching respective dynamic filters to inputs of each MISO sub-model to align, with respect to time, input data. In at least one such aspect, the attached dynamic filters mimic and model the behaviors of a time delay and transaction process in the subject industrial process. In some aspects, attaching respective dynamic filters to inputs of each MISO sub-model includes obtaining at least one of the respective dynamic filters from a dynamic finite impulse response (FIR) model by use of a linear model order reduction technique. The dynamic FIR model may be an existing model, i.e., created prior to a present iteration of performance of the method. The FIR model may be used, for example, for model predictive control (MPC). Alternatively, or in addition, attaching respective dynamic filters to inputs of each MISO sub-model may include obtaining at least one of the respective dynamic filters from input-output time-series data of the subject industrial process by use of a subspace identification technique.

In some aspects of the method, training the ROM of the subject industrial process includes dividing the generated simulation data into a training dataset and a testing dataset, establishing the ROM by fitting the training dataset to a polynomial-based implementation of the FPM with polynomials of a $2^{nd}$, or higher, order, and validating the established ROM with the testing dataset. Training the ROM may further include configuring the FPM of the subject industrial process based on at least one of: (i) a flowsheet of the subject industrial process, (ii) a design of the subject industrial process, and (iii) operational parameters of the subject industrial process. Alternatively, or in addition, training the ROM may further include generating the generated simulation data by performing the one or more simulations with variable values encompassing input variations and historical operation of the subject industrial process.

In some aspects, configuring the FPM of the subject industrial process includes at least one of building one or more simulation blocks and connections, according to the flowsheet of the subject industrial process. Alternatively, or in addition, configuring the FPM of the subject industrial process may include configuring one or more designs of the subject industrial process, or operational parameters of the subject industrial process, in a given simulation of the one or more simulations. Generating the simulation data by performing the one or more simulations may include running multiple simulations of the subject industrial process based on a plurality of combinations of input values and operating conditions, and recording simulation output data from the multiple simulations as the generated simulation data.

According to another aspect of the present disclosure, a computer-based system for creating a model for operating a real-world industrial process includes a processor, and a memory with computer code instructions stored thereon. The processor and the memory, with the computer code instructions, may be configured to cause the system to train a ROM of a subject industrial process using simulation data generated from one or more simulations of the subject industrial process performed using a FPM of the subject industrial process. The processor and the memory, with the computer code instructions, may be further configured to cause the system to construct a SDROM of the subject industrial process by (i) dividing the trained ROM into a plurality of MISO sub-models, (ii) partitioning each MISO sub-model into multiple component terms, and (iii) inserting a gain factor into each partitioned component term to form a gain vector for each MISO sub-model. The processor and the memory, with the computer code instructions, may be further configured to cause the system to deploy the SDROM online to operate the subject industrial process.

According to yet another aspect of the present disclosure, a computer program product for creating a model for operating a real-world industrial process includes a non-transitory computer-readable medium having computer-readable program instructions stored thereon. The instructions, when executed by a processor, cause the processor to create a model for operating a real-world industrial process as described herein.

It is noted that embodiments of the method, system, and computer program product may be configured to implement any embodiments or combination of embodiments described herein.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 3A is a flow diagram depicting an example method of creating a reduced order model (ROM) according to embodiments of the example method shown in FIG. 2.

FIG. 3B is an input-output diagram corresponding to steps of the example method shown in FIG. 3A.

FIGS. 10A-10C are time series plots showing example transaction dynamics of an industrial process using linear dynamic filters in a deployment of a SDROM according to embodiments.

FIG. 11A is a tabular representation of performance metrics of selected sub-models of an example SDROM deployed in an industrial process according to embodiments.

FIG. 14 is a diagram illustrating an example internal structure of a computer in the environment of FIG. 13.

DETAILED DESCRIPTION

Figure 1A:
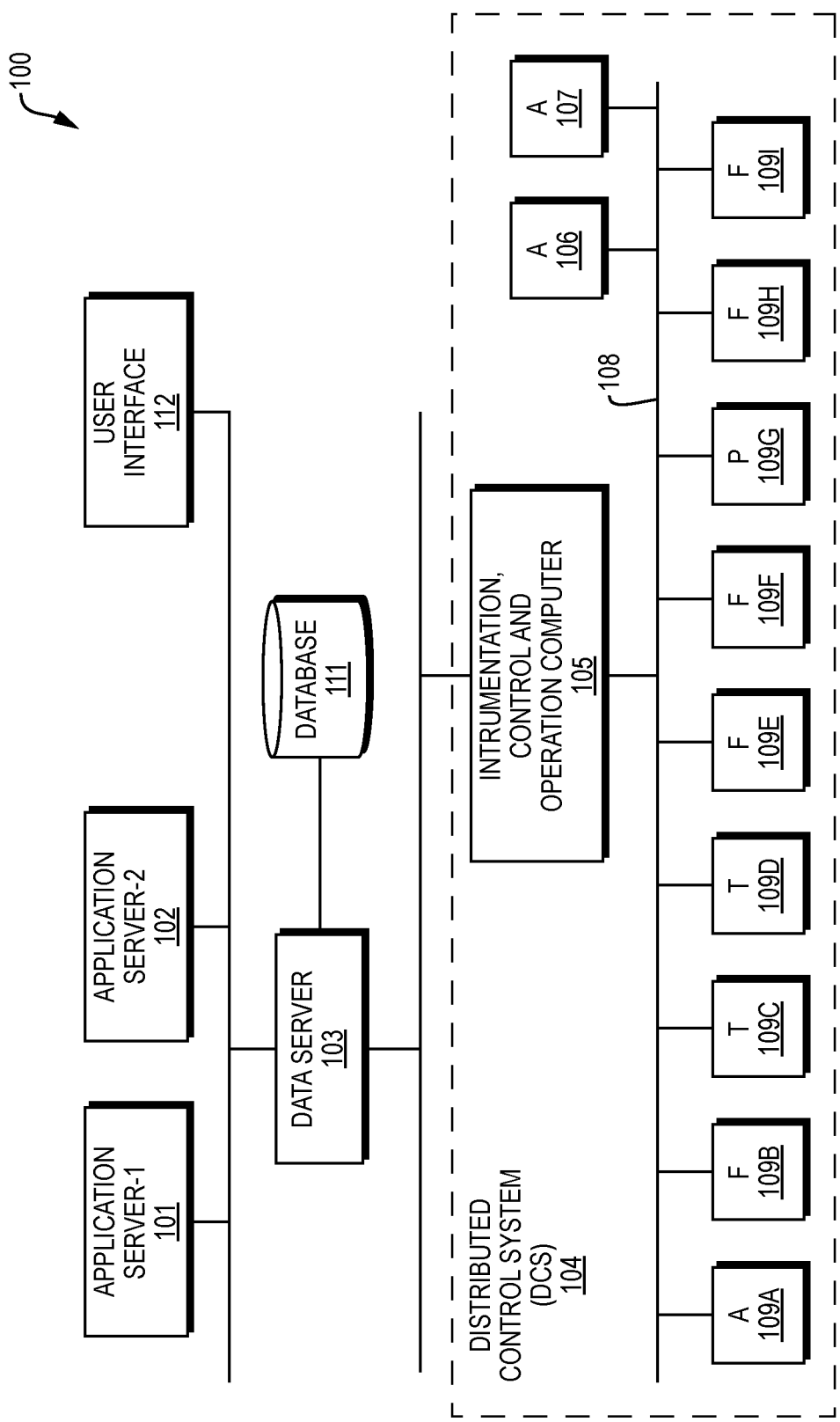
FIG. 1A is a block diagram depicting an example plant network environment in which an industrial process operates according to embodiments of the present disclosure.

A description of example embodiments follows.

Embodiments of the present disclosure provide functionality for building and deploying sustainable reduced-order process models, efficiently monitoring degradations in manufacturing process models, identifying one or more problematic sub-models to update, and updating the same. Such functionality may include constructing a reduced-order model (ROM) with simulation data, splitting the ROM into multiple multi-input, single-output (MISO) sub-models, attaching a set of dynamic filters to each MISO sub-model, and dynamically filtering raw plant data such that substantially all plant operational data may be used in such process model monitoring. By way of features such as these, the presently disclosed methods, systems, and products thus avoid burdens to which existing solutions are subjected, by the reliance of existing solutions upon steady-state detection, while running a real-time optimization (RTO) engine.

Aspects disclosed herein include (1) a digital twin model, (2) a special partition technique, (3) a plurality of dynamic filters and (4) a method of obtaining the same, (5) a procedure for calculating performance metrics, (6) a sustainable dynamic reduced order model (SDROM) adaptation scheme, and (7) a set of reliable model derivatives.

(1) Digital Twin Model—A user-preferable ROM is trained from simulation data generated from full-scale simulations of a complex first-principles model (FPM). Such simulations may be based on a specific process flowsheet and configurations of a real industrial operation unit employed by a subject industrial process. The subject industrial process may support a refinery plant having a full-scale complex FPM. Such a refinery plant may include, for example, a crude distillation unit (CDU), a fluid catalytic cracking unit (FCCU), a continuous stirred-tank reactor (CSTR) and such, or a whole refinery, such as a complex petrochemical plant, etc. The simulation data may be generated using developed simulation techniques and software tools, such as Aspen HYSYS® and Aspen Plus®, each available from Aspen Technology, Inc. Such simulation data is information-rich, often having been generated in conjunction with a specific industrial process design, using methods such as a so-called design of experiments (DOE) method. A trained ROM model may therefore be used to predict process responses similar or close to those that may be observed from a real-world industrial operation unit or plant. It should be noted that such a ROM, as constructed and deployed by embodiments, offers significant advantages over a traditional FPM.

One such advantage is that the ROM has a typical multi-input, multi-output (MIMO) causal structure, for example, Y=g(X). This is in contrast to the conventional FPM, which has a closed-form of equation-based structure, for example, f (X, Y)=0. In the two preceding examples, $X=[x_1, x_2, \ldots, x_r]$, and $Y=[y_1, y_2, \ldots, y_m]$ are input and output vectors respectively.

A second advantage of a ROM over a traditional FPM is that a typical multi-input and multi-output (MIMO) ROM has a sparse model structure, such that one or more sub-model blocks are often empty, i.e., there is not always a correlation between one input and one output found from the simulation data. Such a sparse model structure enables one or more heavily simplified input-output sub-models to be used instead of a full-scale model without much loss of predictability.

(2) Special Partition Technique—A special partition technique allows the trained ROM to be further simplified based on a ROM's sparsity. The trained ROM is thus simplified into a plurality of multi-input single-output sub-models. Each multi-input single-output sub-model contains a linear portion (L), a nonlinear portion (NL), and a residual term (Res), where the nonlinear portion includes a set of second-order, or higher-order, polynomials of one or more inputs. This partitioned model structure facilitates identifying and troubleshooting model degradations, and therefore facilitates monitoring and adapting the ROM online. In existing methods, a full-scale model may consist of tens to hundreds of inputs and outputs to cover an operating unit or a whole plant. In contrast, by using the aforementioned special partition technique, aspects of the present disclosure enable a complex task of plant model monitoring and sustainment to be conducted with multiple level partitions as described below:

a) Level-1 partition: A nonlinear multi-input multi-output (MIMO) ROM is divided into one or more MISO sub-models. The single output of a given sub-model may represent a controlled key process variable (e.g., reactor temperature, or pressure or product output mass flow-rate), a calculated physical property (e.g., average temperature inside of a furnace), or an inferential estimation of a special key performance indicator (KPI) (e.g., catalyst activity, or reaction conversion rate of a special substance). Such MISO sub-models may be referred to as level-1 sub-models.

b) Level-2 partition: Each level-1 sub-model is further partitioned into one or more subordinate sub-models. Each subordinate sub-model includes at least one linear portion corresponding to an independent input, at least one nonlinear (e.g., quadratic) portion corresponding to the aforementioned independent input, and at least one cross-over term dependent upon other inputs. As a result, performance degradation of a MISO sub-model (i.e., a level-1 sub-model) can be estimated and compared in partitions. Such further partitioned level-1 sub-models may be referred to as level-2 sub-models. Such level-2 sub-models are more transparent than a black-box model (e.g., a neural network model), facilitating determination of a root-cause of degradation of a ROM, and of appropriate corrective actions to take in order to mitigate such model degradation in a timely manner.

(3) Plurality of Dynamic Filters—A plurality of dynamic filters for each partitioned MISO sub-model is used to filter input data. A filter of the plurality may be, for example, a first-order linear dynamic filter with a time delay, or a second-order linear dynamic filter with a time-delay. The time delay may also be referred to as dead time. In some aspects, linear dynamic filters can be mathematically represented by a Laplace Transfer Function. The Laplace Transfer function may be represented in a continuous format of F(s), or may be represented in a discrete-time format of F(z). The dynamic filters are connected to the model inputs, and are configured to filter raw sensor measurement data of a subject industrial process. The filtered data is fed into each MISO sub-model. Each MISO sub-model corresponds to a prediction of a targeted physical or chemical property in the subject industrial process. The application of a plurality of dynamic filters with different time delays, and other dynamics, can effectively model transitions of the subject industrial process. Once all time-series data of a set of inputs to a MISO sub-model are filtered with the respective set of dynamic filters, a data alignment is performed. Subsequently to the data alignment, all filtered data can be assumed to be synchronized with an output of the MISO sub-model, and a "pseudo-steady-state" is reached. The traditional, time-consuming "steady-state-detection" (SSD), of existing methods, is rendered unnecessary by aspects of the present disclosure, and can therefore be removed from a subject industrial process upon application of the plurality of dynamic filters with different time delays to the subject industrial process. In this way, utilization of the plurality of dynamic filters significantly facilitates an online RTO implementation of a subject industrial process.

(4) Method of Obtaining Plurality of Dynamic Filters—A method may obtain a plurality of dynamic filters (F(s), or F(z)) for each partitioned MISO model by automatically converting existing finite-impulse-response (FIR) models for advanced process control (APC) using a model-reduction technique, or may obtain filters from a set of automatically selected process data through a subspace identification process. For example, in a model-reduction technique, DMC or DMC3 MPC controller models can be converted into low-order Laplace Transfer Functions (LTF). Regarding the subspace identification process, special techniques for automated data selection and model identification have been developed by the assignee, as documented in U.S. Pat. No. 10,698,372 B2, Computer System and Method for Building and Deploying Predictive Inferential Models Online to Predict Behavior of Industrial Processes, and in U.S. Pat. No. 9,727,035 B2, Computer apparatus and method using model structure information of model predictive control, both of which are incorporated by reference herein.

(5) Procedure for Calculating Performance Metrics—A calculation procedure enables quantitative assessment of a sub-model's degradation over time using minimal process data. A vector of extended model gains may be used to measure model performance degradations, and to audit and measure sub-model predictive errors. Further, aspects of the present disclosure enable inclusion of a set of pre-defined model performance grade scores, e.g., "good," "okay," "poor," and "bad," with color codes (e.g., green for "good," blue for "okay," yellow for "poor," and red for "bad") to provide intuitive indications of a performance status of a sub-model. Such a sub-model may be a level-1 sub-model; however, similar performance metrics may be implemented for a level-2 sub-model. Optionally, alerts or warnings may be issued by sub-models, including level-1 and level-2 sub-models, to guide plant operators and/or engineers in taking corrective actions in a timely manner.

(6) SDROM Adaptation Scheme—A SDROM adaptation scheme enables automated model updates based on pre-configured model adaptation parameters. Such parameters may include a measure of speed of such adaptations, and a maximum number of changes involved that may be made to one or more specified sub-models. In some aspects, an automated ROM adaptation scheme enables a running ROM to self-learn from recently received plant operation data, and accordingly update one or more sub-model(s) in a progressive manner that is constrained by the adaptation parameters. Such recently received plant operation data may be fresh data obtained for the subject industrial process such that the data describes a present, ongoing status of the process or of a plant thereof. Such data thus may have been taken within a period that extends by less than a number of, e.g., minutes, hours, days, or another measure of time prior to a present time.

The ROM adaptation scheme described above assumes the advantages of ROM partitions, and thereto adapts the vector of extended model gains to achieve a target of online model self-sustainment. A specific optimization problem, with an objective function and constraints, may serve the online SDROM model adaptation. A workflow, with multiple steps, may be defined for the ROM adaptation scheme for reliable and robust industrial applications.

(7) A Set of Reliable Model Derivatives—Model derivatives regarding each input and output pair of a ROM may be provided to serve an APC and RTO system. A sustainable ROM can perform derivative calculations online, from its analytic derivative equations, while existing FPM systems need to perform much more complex calculations under perturbations to offer derivatives. Due to the simplicity in derivative calculation and the sustainability of a ROM, aspects of the present disclosure are able to better serve the RTO system than a traditional FPM model approach. For example, where operation of a Generic Dynamic Optimization Technology (Aspen GDOT™) system, available from Aspen Technology, requires derivative information of a subject industrial process, the online sustainable dynamic ROM of the present disclosure is a perfect fit, able to provide and feed accurate derivative information into a GDOT system in a timely and reliable manner when so configured.

Applicability of Presently Disclosed Methods and Systems

The methods and systems disclosed herein are widely applicable, and are not limited to online GDOT applications. Embodiments may be applied to many model-based real-time model predictive control (MPC) and/or optimization solutions. For example, aspects of the present disclosure may be applied to model-based scheduling and plant production planning optimizations. The workflows and methods described herein are able to monitor, audit and adapt an online ROM in a timely manner, i.e., the disclosed method and system is for a sustainable, dynamic ROM (SDROM) that, over time, is able to better to serve an APC or RTO system, so as to reduce profit loss due to model degradation and sustain the optimal performance of a RTO system.

Example Environment for Plant Production Processes

FIG. 1A is a block diagram depicting an example network environment 100 for creating a model for operating a real-world industrial process according to aspects of the present disclosure. System computers (e.g., application servers) 101, 102 may be configured to operate as a digital twin of the subject industrial process. In some aspects, each one of the system computers 101, 102 may operate in real-time as a digital twin of the subject industrial process alone, or the system computers 101, 102 may operate together as distributed processors contributing to real-time operations as a single digital twin. In other aspects, additional system computers may also operate as distributed processors, contributing to the real-time operations of system computers 101, 102 as a digital twin. In some embodiments, system computers 101, 102 operating as a SDROM may be configured with a model builder and deployment engine for building/deploying a sustainable dynamic reduced-order model for performing real-time optimization on the plant process. The system computers 101, 102 may communicate with a display device configured with a user interface (UI) 112 for a user to provide input in building, training, and deploying the SDROM and to view the results of the built, trained, and deployed SDROM.

The system computers 101 and 102 may communicate with the data server 103 to access collected data for measurable process variables from a historical database (i.e., a plant asset database) 111. The data server 103 may be further communicatively coupled to a distributed control system (DCS) 104, or any other plant control system, which may be configured with sensors and instruments 109A-109I that collect data at a sampling period (e.g., one sample per minute). The sensors and instruments 109A-109I may continuously collect (sample) data for the measurable process variables, and online analyzers 106, 107 (e.g., gas chromatographs) may collect data at a longer sampling period (e.g., one sample every 15-60 minutes). Data may also be collected from lab analysis results with an even longer sampling period (e.g., one sample every 8 to 48 hours). The instruments 109A-109I may communicate the collected data to an instrumentation, control, and operation computer 105, also configured in the DCS 104, and the instrumentation, control, and operation computer 105 may in turn communicate the collected data to the data server 103 over communications network 108. The data server 103 may then archive the collected data in the historical database 111 for building and training the SDROM. The data collected may vary according to types of target processes and may be retrieved in real-time from the historical database 111.

The collected data may include measurements for various measurable process variables. These measurements may include, for example, a feed stream flow rate as measured by a flow meter 109B, a feed stream temperature as measured by a temperature sensor 109C, component feed concentrations as determined by an analyzer 109A, and reflux stream temperature in a pipe as measured by a temperature sensor 109D. The collected data may also include measurements for process output stream variables, such as the concentration of produced materials, as measured by analyzers 106 and 107. The collected data may further include measurements for manipulated input variables, such as reflux flow rate as set by valve 109F and determined by flow meter 109H, a re-boiler steam flow rate as set by valve 109E and measured by flow meter 109I, and pressure in a column as controlled by a valve 109G. The collected data reflects operating conditions of a representative plant of a subject industrial process during a particular sampling period.

The collected data may be archived in the historical database 111 for access by a model builder (executing on system computers 101, 102) to build and train a SDROM. Based on the output data archived for a process variable, the model builder may build and train a SDROM as a dynamic, self-monitoring, and automated adaptable digital twin model with a specific partitioning technique, a set of dynamic filtering techniques, extended model-gain vector estimation, and projection to latent space (PLS) regression techniques.

In FIG. 1A, a deployment engine (executing on system computer 101 and 102) may execute the built SDROM for online deployment. The values generated by the SDROM on the system computer 101, 102 may be provided to the instrumentation, control, and operation computer 105 over the network 108 for an operator to view at the UI 112. Through the viewed values, the operator may perform model health and performance monitoring, model updates, and program any other component of the DCS 104, or any other plant control system or real-time optimizer or processing system coupled to the DCS 104. Alternatively, the instrumentation, control, and operation computer 105 can store the historical data via the data server 103 in the historical database 111, and execute the SDROM in a stand-alone mode, automatically programming any other component of the DCS 104, or any other plant control system or real-time optimizer or processing system coupled to the DCS 104. For example, output of the SDROM may be used to automatically control elements of the plant. Collectively, the instrumentation, control, and operation computer 105, the data server 103, and various sensors and output drivers (e.g., 109A-109I, 106, 107) forming the DCS 104, work together to operate, perform, and support various aspects of the present disclosure.

The example architecture 100 of the computer system supports the process operation of the present invention in a representative plant of a subject industrial process. In some aspects, the representative plant may be an operation unit at a refinery or a chemical processing plant having a number of measurable process variables such as feed flow rate, feed composition, temperature and pressure, among other process variables. It should be understood that other aspects of the present disclosure may be used in a wide variety of other types of technological processes or equipment in the useful arts.

Figure 1B:
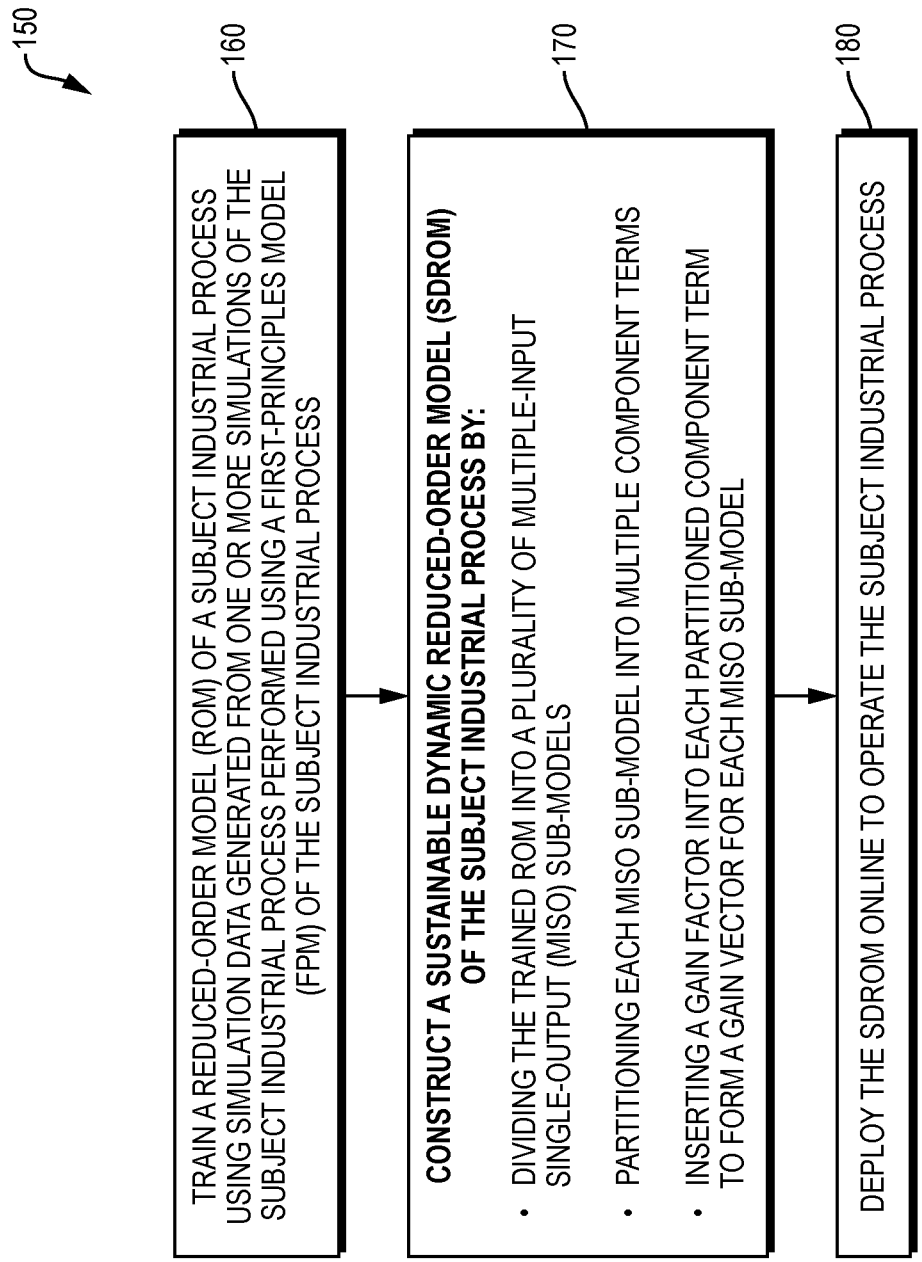
FIG. 1B is a flow diagram depicting an example method of creating a model for operating a real-world industrial process according to embodiments of the present disclosure.

FIG. 1B is a flow diagram depicting an example method 150 of creating a model for operating a real-world industrial process according to embodiments of the present disclosure. In some aspects, the method 150 includes training 160 a ROM of a subject industrial process using simulation data generated from one or more simulations of the subject industrial process. The simulations are performed using a FPM of the subject industrial process. The method 150 further includes constructing 170 a SDROM of the subject industrial process by dividing the trained ROM into a plurality of MISO sub-models, partitioning each MISO sub-model into multiple component terms, and inserting a gain factor into each partitioned component term to form a gain vector for each MISO sub-model. The method 150 further includes deploying 180 the SDROM online to operate, e.g., control or optimize, the subject industrial process.

The term "operate" and its derivatives such as "operating," as used herein, encompass aspects of engineering control that may be applied to a subject industrial process or system, as well as specific components and techniques used for optimization of such an industrial process or system.

Method of Building and Deploying SDROM Model

Figure 2:
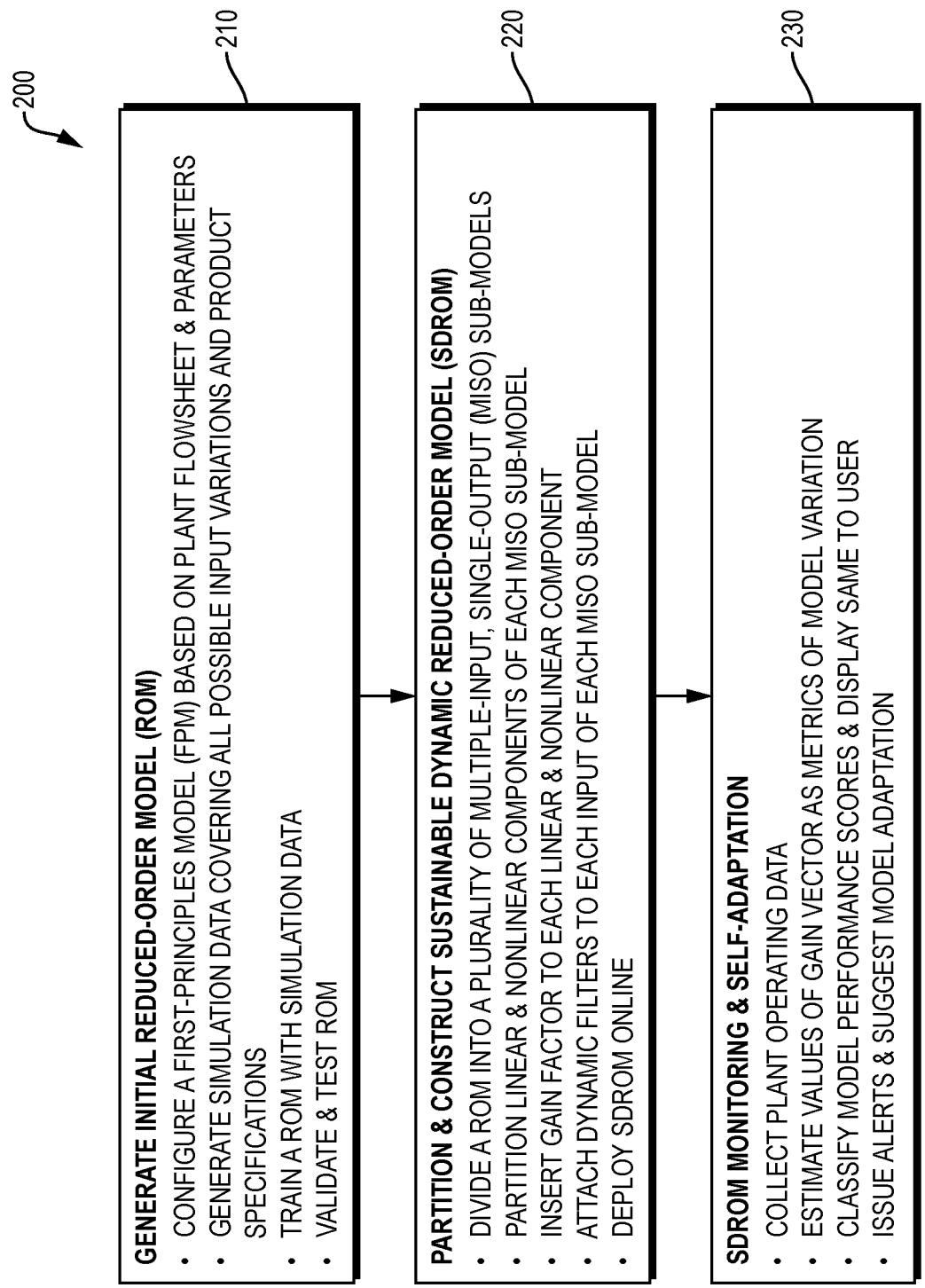
FIG. 2 is a flow diagram depicting an example method of building and deploying a sustainable dynamic reduced-order model (SDROM) for an industrial process according to embodiments.

FIG. 2 illustrates a flowchart of an example method 200 of building and deploying a SDROM in embodiments of the present disclosure. The built and deployed SDROM may be used to generate current estimates and future predictions of parameters pertaining to a plant of a subject industrial process. The built and deployed SDROM may also be referred to as a "sustainable digital twin," meaning that the SDROM digitally models/predicts behavior of a real-world plant/facility. Some steps of the example method 200 are described in further detail hereinbelow with reference to FIGS. 3A, 4A, and 5.

The method 200 of FIG. 2 begins at step 210 by configuring a FPM by using professional software tools such as Aspen HYSYS® or Aspen Plus®, each available from Aspen Technology, Inc. To configure the model structure, the method 200 at step 210 may select a plurality of relevant process variables of a subject plant process as input(s), and another plurality of process variables as outputs. The method 200 at step 210 may further select a set of parameter values pertaining to process equipment and flowsheets as normal operating parameters and conditions. Such parameters selected as normal operating conditions may include, for example, feed flow rate range, feed compositions, and high and low control limits of a temperature. Such parameters may be obtained from a historical database, i.e., the plant asset database 111. After configuration, a FPM may run multiple simulations with different feed conditions to mimic various operations of a subject industrial process. In some aspects, a design of experiment (DOE) technique may be used to improve efficiency and coverage of the subject industrial process by the simulation. As a result, data generated by simulation are used to train, test, and validate an initial ROM.

FIG. 3A depicts an example method of performing step 210 of method 200. The example method of step 210 commences by configuring 311 a FPM based on a plant flowsheet and parameters of the plant. The example method of performing step 210 of method 200 further includes generating 312 simulation data covering input variations and product properties specifications. The example method of performing step 210 of method 200 continues by training 313 a ROM with simulation data and known process constraints, and concludes by validating and testing 314 the trained ROM with preserved simulation data, i.e., a portion of the simulation data reserved for validation and testing.

FIG. 3B is a flow diagram of input-output diagrams corresponding to steps of the example method 210 shown in FIG. 3A. Specifically, an example configured FPM 315 is shown to be transformed into the trained ROM 316.

The example configured FPM 315 may have a general structure as shown in FIG. 3B. In FPMs such as the example FPM 315, model inputs are typically a set of independent process variables, for example, represented as an input vector x, and corresponding upper and lower operational limits $x_L$ and $x_H$ respectively. Further, model outputs are a set of dependent process variables, represented by a vector y. Accordingly, the FPM 315 can be mathematically presented as follows:

$$F(x, y, \theta) = 0 \tag{1a}$$

Subject to:

$$g(x, y) \leq 0 \tag{1b}$$

$$x_L < x < x_H \tag{1c}$$

For a set of given input values and operation conditions, a solver will solve equation (1a) and find the solution that also satisfies constraints (1b) and (1c) as output value of y. The example methods solve a large number of simulations under various values of inputs and operation conditions, and generate a large amount of simulation data to reflect subject process behaviors under different operation cases and conditions. The method 200 at step 313, 314, uses the data resulting from the simulation (or a portion thereof) to train and test a ROM. It should be noted that a trained ROM is most accurate when all data resulting from the simulation is used, or, at least, as large of a portion thereof as may be possible. The initial ROM built at step 313 and 314, may have a significantly simplified model structure, as shown below:

$$y_i = h_i(x) \quad (2a)$$

$$s.t. g(x, y_i) \le 0 \quad (2b)$$

$$x_L < x < x_H \quad (2c)$$

In the above model structure, vector x represents model inputs, subject to corresponding upper and lower operational limits $x_L$ and $x_H$ respectively. Original model outputs, represented by vector y, are decomposed into a set of dependent process variables, such that each dependent variable is represented by $y_i$, as an output of a MISO sub-model. Thus, one FPM, e.g., (315), can be replaced with a digital twin, i.e., a ROM consisting of multiple MISO sub-models, e.g., (316).

A major difference between the ROM (316 given by equations 2a, 2b, 2c) and FPM (315 given by equation 1a, 1b, 1c) is that equation 2a is an explicit input-output causal model from which output $y_i$ can be easily obtained for a given set of input values, without a number of iterative calculations with equations 1a, 1b, 1c, as is needed in FPM cases.

Figure 4A:
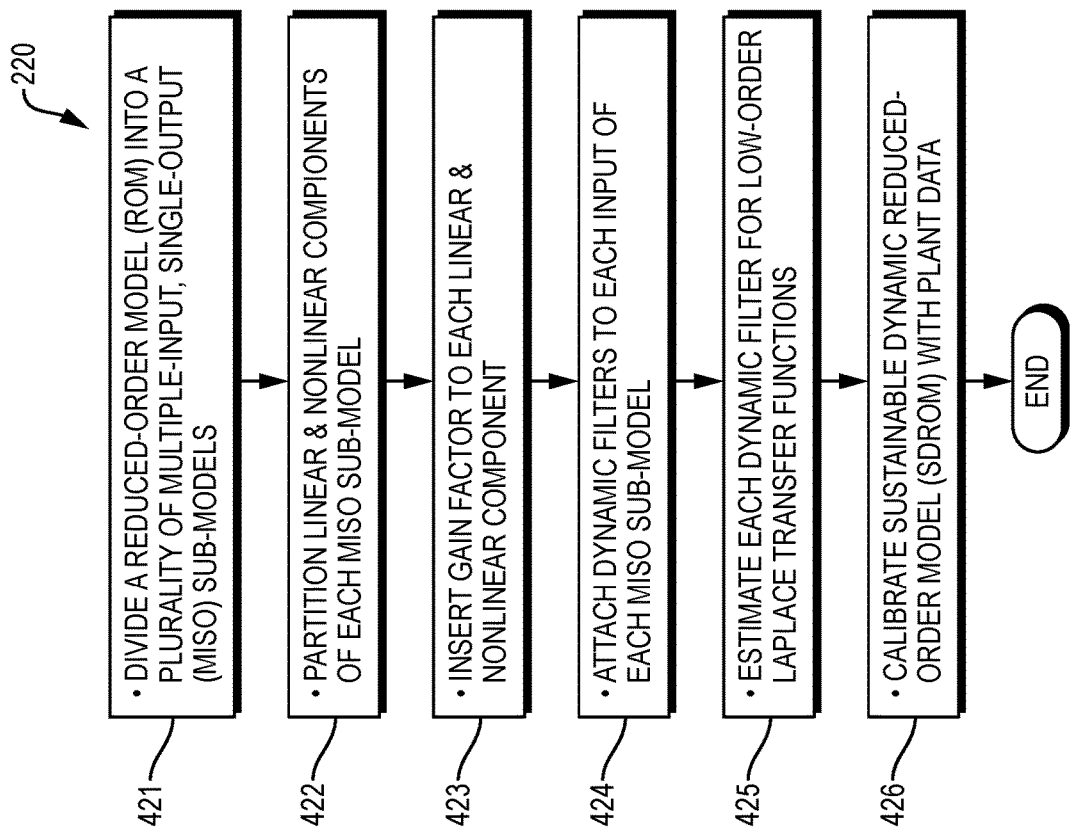
FIG. 4A is a flow diagram depicting an example method of constructing a SDROM according to embodiments of the example method shown in FIG. 2.

Returning to FIG. 2, at step 220, the method 200 partitions and constructs a SDROM. FIG. 4A depicts an example method of performing the partitioning and constructing step 220 of method 200. Such partitioning and constructing 220 includes dividing a ROM into a plurality of MISO sub-models 421, partitioning the MISO sub-models into linear and non-linear components 422, inserting a gain factor into each linear and non-linear component 423, attaching dynamic filters to each input of each MISO sub-model 424, estimating each dynamic filter for low-order Laplace transfer functions 425, and calibrating the SDROM with plant data 426. Attached filters as described herein may mimic the time-delay and transition process of a set of given parameters of the subject industrial process.

Figure 4B:
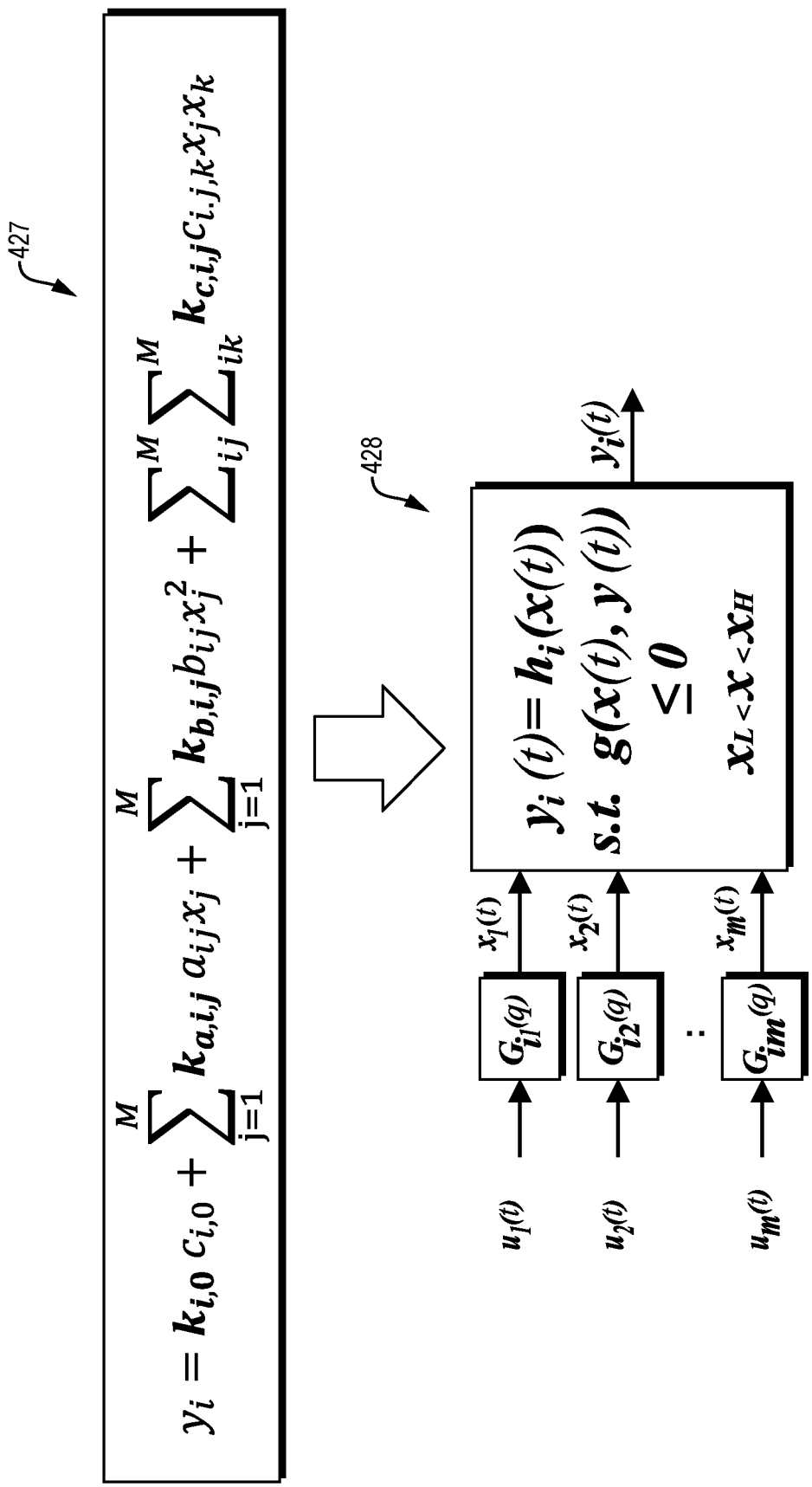
FIG. 4B is an input-output diagram corresponding to a SDROM constructed according to the example method shown in FIG. 4A.

FIG. 4B is an input-output diagram corresponding to an SDROM constructed according to the steps of the example method 220 shown in FIG. 4A. Specifically, the insertion 427 of a vector of extended model gain factors into partitioned MISO sub-models to form a SDROM with an example structure 428 as shown.

The method 200, at step 220, as shown in FIG. 4A, further develops a SDROM by (i) partitioning each MISO sub-model into a linear model portion and a nonlinear model portion (for example, a 2nd-order quadratic term plus a 2nd-order crossover product of two input variables in a polynomial math representation) at steps 421-422; (ii) defining a vector of extended model gain factors and inserting it 423 into each partitioned MISO sub-model such as the MISO sub-model 427 shown in FIG. 4B; and (iii) attaching a group of dynamic filters 424 to each input of the MISO sub-model 428 shown in FIG. 4B, where the dynamic filters (Gij(q), j=1, 2, . . . , m; in 428) may be obtained from an APC controller model or estimated from plant historical data. FIG. 4B illustrates an example embodiment of the SDROM model structure 428. The method 200 at step 425 further estimates each dynamic filter, e.g., with a dynamic model order reduction technique (Dale Enns, *Model Reduction for Control System Design, NASA Contractor Report* 170417, March 1985), or directly from plant historical data via subspace identification techniques (Zhao et al, Computer System and Method for Building and Deploying Predictive Inferential Models Online to Predict Behavior of Industrial Processes, U.S. Pat. No. 10,698,372 B2). The method 200 at step 426 uses recent historical plant data to further calibrate the constructed SDROM by feeding plant input time-series data $\{u_1(t) u_2(t), \ldots, u_m(t),\}$, into the constructed SDROM. Following the data flow of the input-output diagram 428 of FIG. 4B, each MISO sub-model 427 receives filtered time series data $\{x_1(t), x_2(t), \ldots, x_m(t),\}$. Elements of the filtered time series data (e.g., $x_1(t)$, etc.) are paired with corresponding elements of the sub-model output time series data $\{y_i(t)\}$ obtained from historical plant sensor measurements. A vector of estimations of model gain factors ($K_i$) may be obtained by minimizing the prediction error of a MISO sub-model. Such minimization of prediction error may be completed by a least-square regression (LS) or a PLS algorithm. The method 220 further completes the SDROM calibration by merging values of model coefficients and the estimated model gain vector $K_i$. For example, Let $C_{i,0} = (k_{i,0} c_{i,0})$; $a_{ij} = (k_{a,i,j} a_{ij})$, $b_{ij} = (k_{b,i,j} b_{ij})$;
and reset gain vector as $K_i = [1, 1, \ldots, 1]$.

Figure 5:
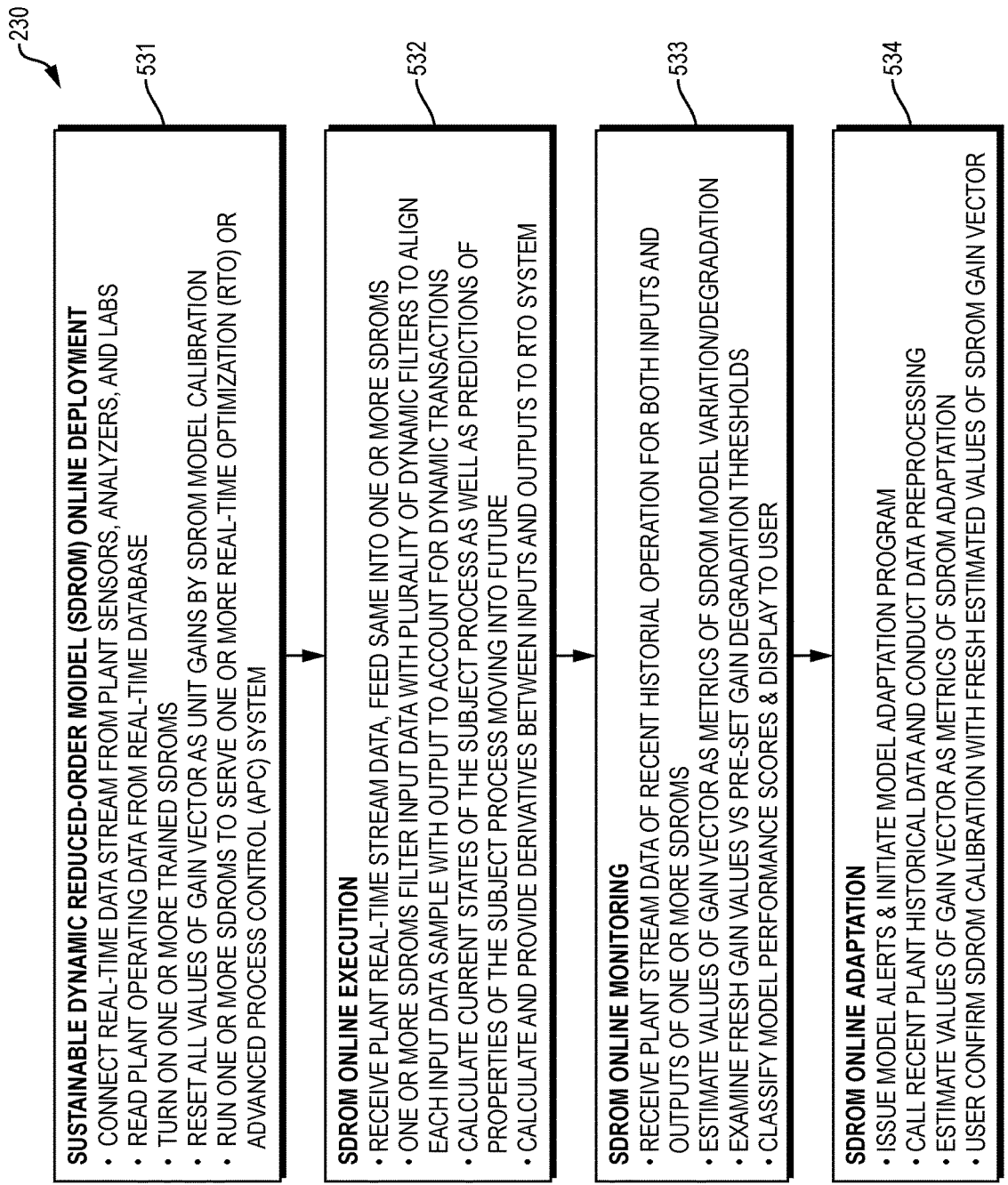
FIG. 5 is a flow diagram depicting an example method of deploying a SDROM according to embodiments of the example method shown in FIG. 2.

Once again returning to FIG. 2, at step 230, the method 200 deploys, runs, monitors, and self-adapts a SDROM built at steps 210 and 220 of method 200. FIG. 5 depicts an example method of step 230. Such monitoring and self-adaptation performed in the method 230 includes collecting plant operating data, estimating values of the gain vector as metrics of model variation, classifying model performance scores, displaying model performance scores to a user, and issuing alerts so as to suggest model adaptations. Specifically, step 230 begins by deploying one or more SDROMs online 531. Deploying the SDROM online may include connecting a real-time data stream from plant sensors, analyzers, and lab samples to the SDROM, e.g., through network 108 and data server 103 of FIG. 1A, reading plant operating data from real-time database 111, activating one or more trained SDROMs, resetting values, e.g., all values, of the sub-model gain vector to be unit gains by way of calibration of the SDROM(s), and running the one or more SDROMs to serve one or more RTO or APC systems. Step 230 subsequently moves to an online execution procedure 532, wherein real-world plant/facility real-time streams of data samples are received and fed into the one or more SDROMs. Method step 532 may receive such data samples at a pre-determined time interval, for example, one reading at all sensors per minute. Such timing of data acquisition reflects industrial standard practices for an APC or a generic dynamic optimization technology (GDOT) application. Method step 532 continues by pre-processing, i.e., filtering input data of the one or more SDROMs with the plurality of dynamic filters to align each input data sample with a corresponding output value, in time, to account for dynamic transitions. Such filtered data are mathematically equivalent to being aligned with the single output of each output; therefore, the traditional, so called "steady state detection" (SSD) for data processing is rendered unnecessary by aspects of the present disclosure. Method step 532 further includes calculating current states of the subject industrial process, and predicting properties of the subject industrial process moving into the future by processing the input data through the SDROM which is configured to predict the properties. Subsequently, the method 230 at step 532 calculates derivatives between inputs and outputs and provides the same to the RTO system. Such predictive values may include, for example, special product properties, key process indicators (KPI), and the like. In some cases, the example method 230 further calculates model derivatives based on current input and output values and a SDROM, and further supplies such information to an APC or RTO system for optimal operation of a subject industrial process.

Subsequent online model monitoring 533, as distinct from model online execution 532, includes collecting plant stream data of recent historical operation for inputs and outputs of the one or more SDROMs, and estimating values of the gain vector as metrics of SDROM variation (or degradation) based on the aforementioned collection of process data over a recent history. Such estimation of values of the gain vector may be described as estimating the extended model gain vector k, where the deviation of each estimated gain value $k_i$ away from a unit gain, i.e. $d_i=(k_i-1.0)$, represents the degradation of a portion of a sub-model of a SDROM. Method step 230 continues such monitoring 533 by examining these fresh gain values vs. pre-set gain degradation thresholds. Based on estimated new values of a gain vector k and a pre-defined threshold, the aspects of the method step 230 are able to quickly identify poorly-performing items in a sub-model, label them, and display them to a user, e.g., with a color code, through a user interface 112. Method step 230 further includes classifying model performance scores, and displaying same to a user. For example, method step 230 may label each sub-model as "good," "okay," "poor," or "bad," and may show the results to a user via user interface 112.

Method step 230 concludes with online adaptation 534 of the one or more SDROMs, by issuing model alerts, initiating model adaptation programs, conducting preprocessing on recent plant historical data, estimating values of the gain vector as metrics of SDROM adaptation, and accepting confirmation, from a user, of SDROM calibration. The method 230, at step 534, may issue a model quality warning and initiate a SDROM adaptation procedure if one or more sub-models are identified as "poor" or "bad" performers. The example method 230, at step 534, may first call recent plant historical data from database 111 through data server 103, pre-process input and output data, and estimate new values of a gain vector of each sub-model while subject to one or more constraints set for a stable and robust model adaptation. For example, the method 230 may not allow a one-step model gain update. Instead, a maximum allowable model gain change at a step may apply, and a set of weighting factors may be used to balance the model adaptation and ensure a smooth gain update and subsequent model calibration with the recent plant data. In addition, the method 230 may offer a user a so called "hot-backup"-adapted SDROM online, wherein the user may track and observe performance of an adapted SDROM as a candidate model for a replacement of the current-running SDROM. A final model update may require user confirmation to ensure a stable and smooth transition process.

Example Applications of Building a SDROM Model

Figure 6A:
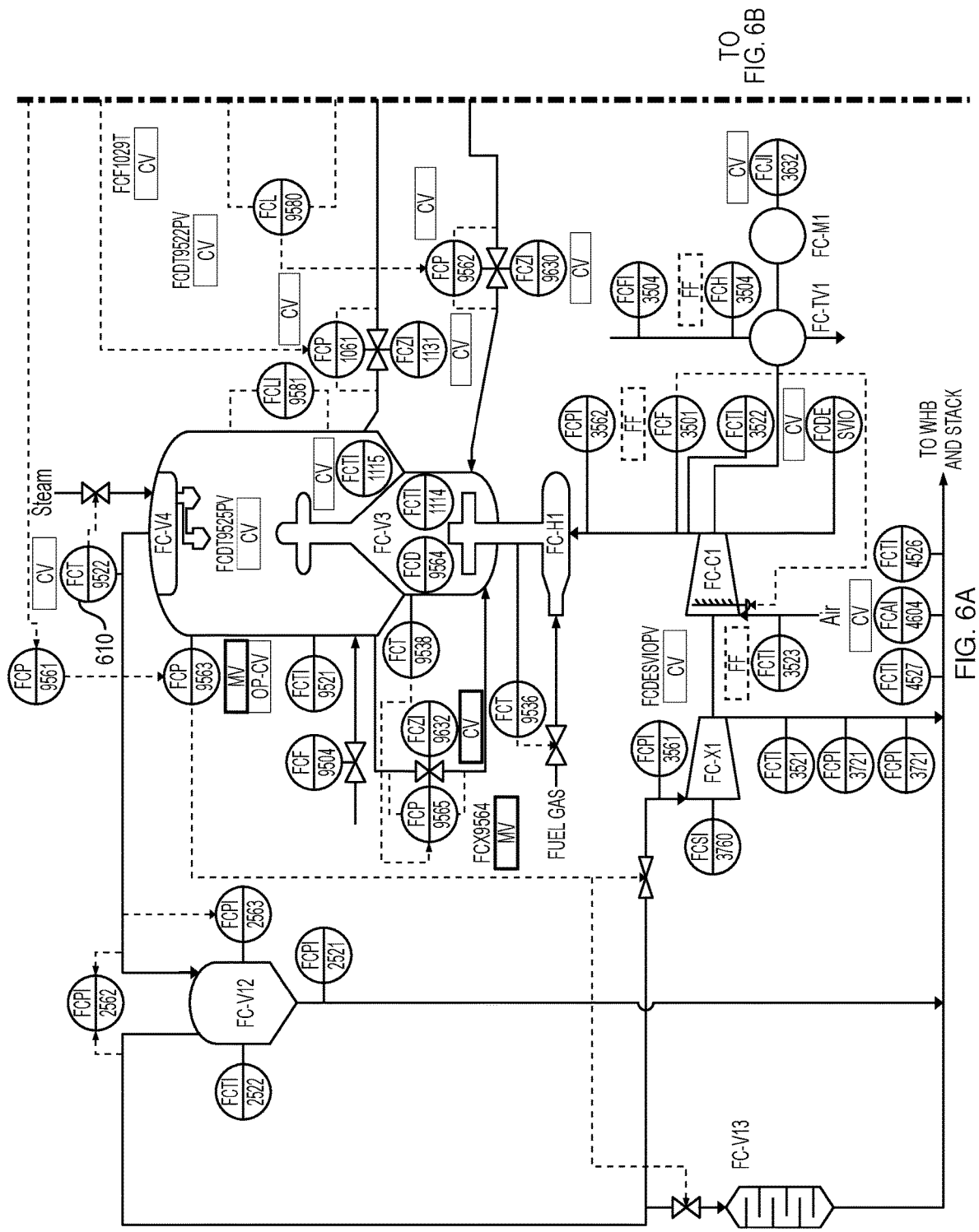
FIGS. 6A-6B comprise a schematic diagram depicting an example system in which a constructed SDROM may be deployed according to embodiments.
Figure 6B:
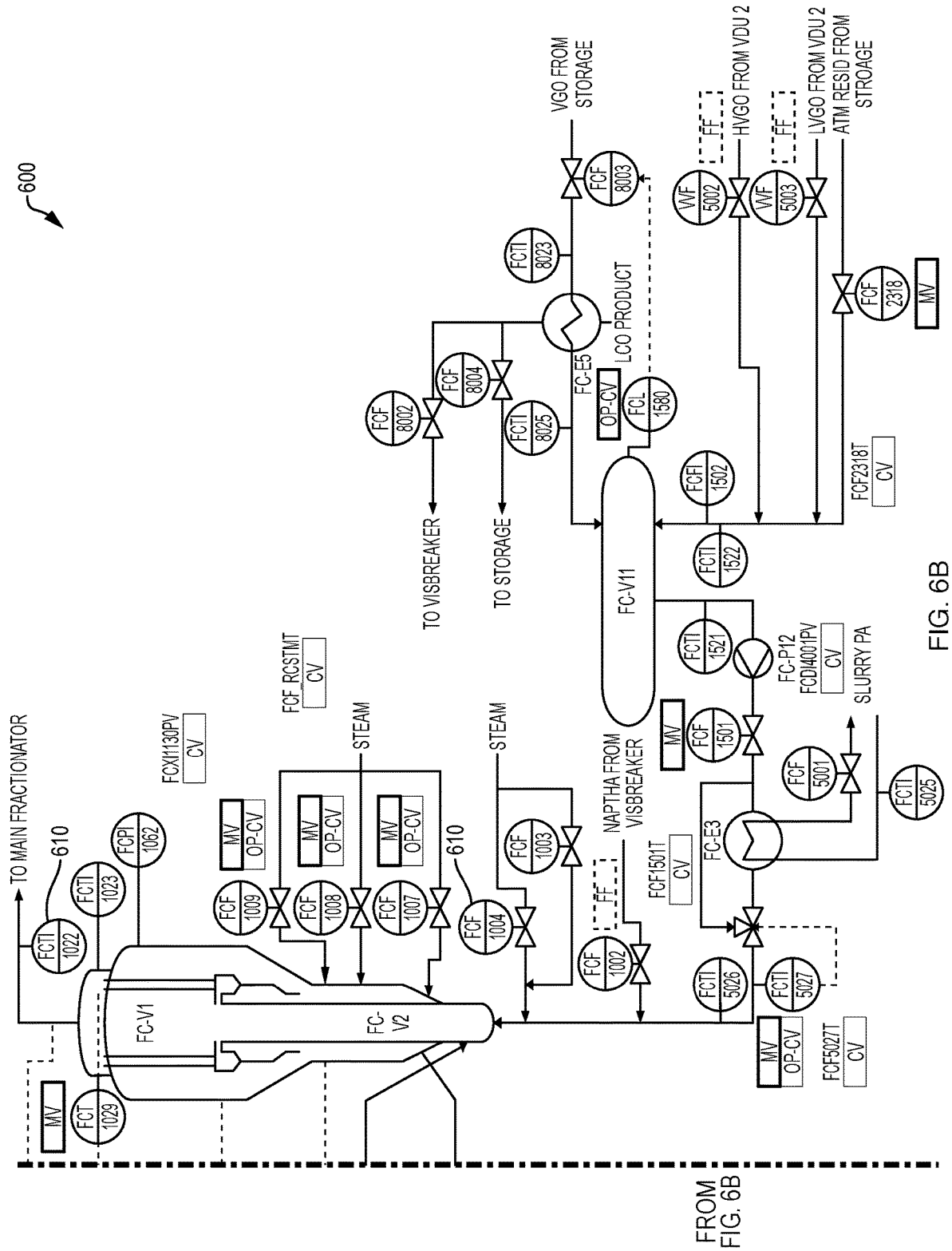

FIGS. 6A and 6B show respective halves of a flowsheet (P&ID diagram) 600 of a Reactor/Regenerator portion of a Fluid Catalyst Cracking Unit (FCCU) in an example refinery plant, in which an example industrial process model is deployed. The flowsheet 600 includes multiple sensors 610 for the process variables of the FCCU. Such a Reactor/Regenerator can produce tens of thousands of tons of gasoline or other petroleum products per day. A sustained process optimization can save a manufacturer running such a FCCU millions of dollars in production profits. Aspects of the present disclosure, when deployed in such an FCCU, can achieve such a sustained optimization.

Figure 7A:
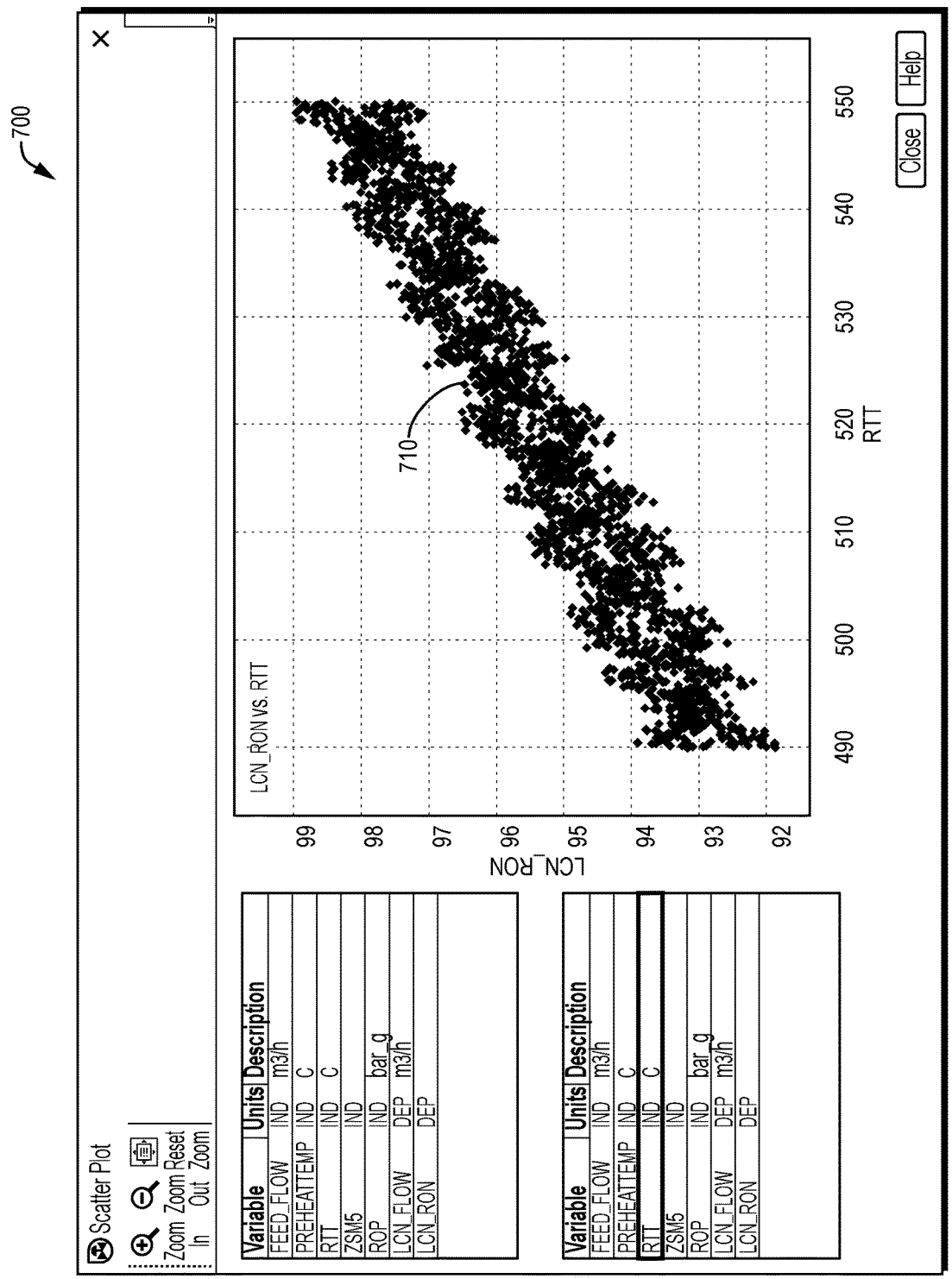
FIG. 7A depicts a user interface including a selected scatterplot of example simulation data pertaining to an industrial process for which a SDROM may be built and deployed according to embodiments.
Figure 7B:
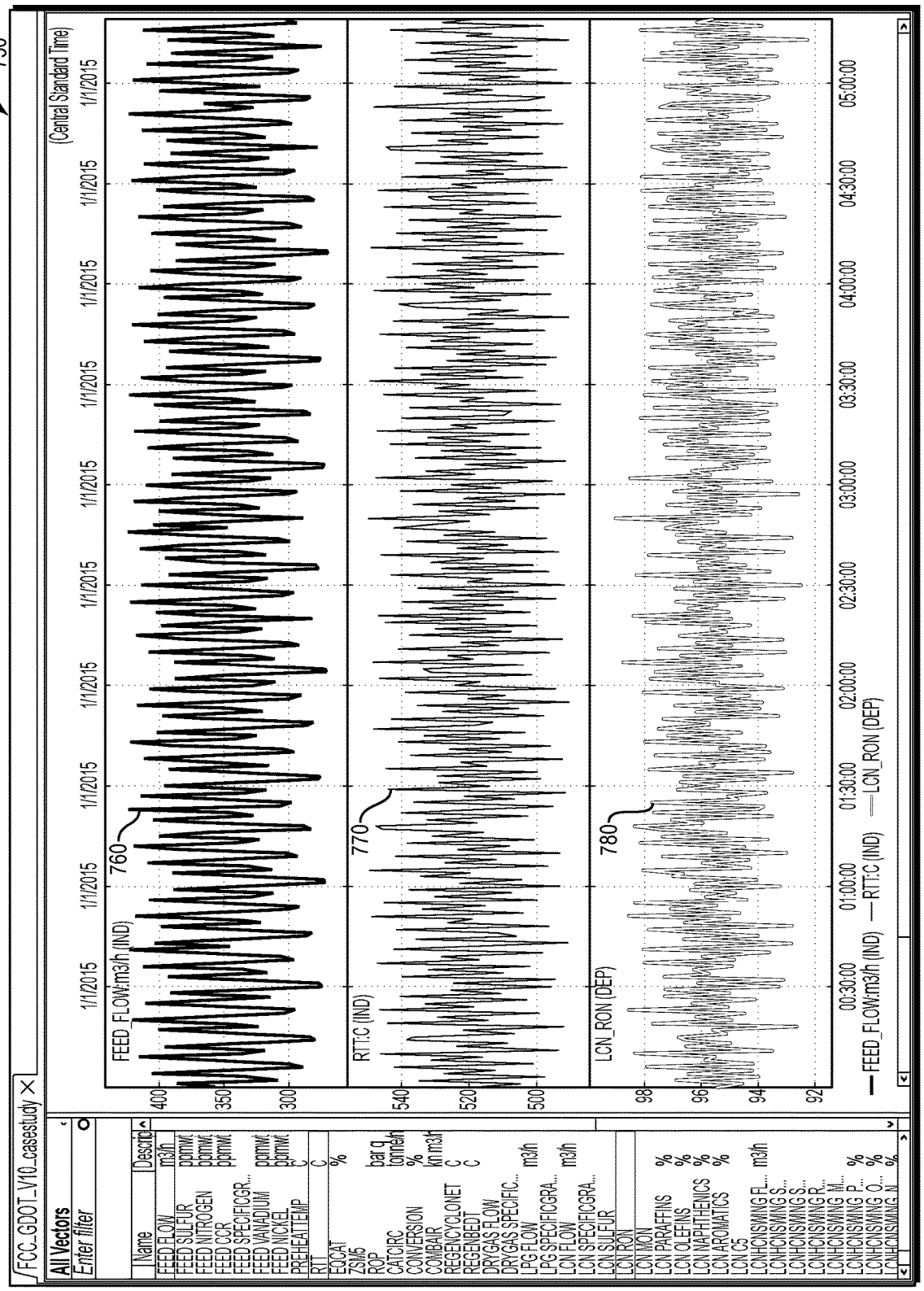
FIG. 7B depicts a user interface including three selected time-series plots of example simulation data pertaining to an industrial process for which a SDROM may be built and deployed according to embodiments.
Figure 8:
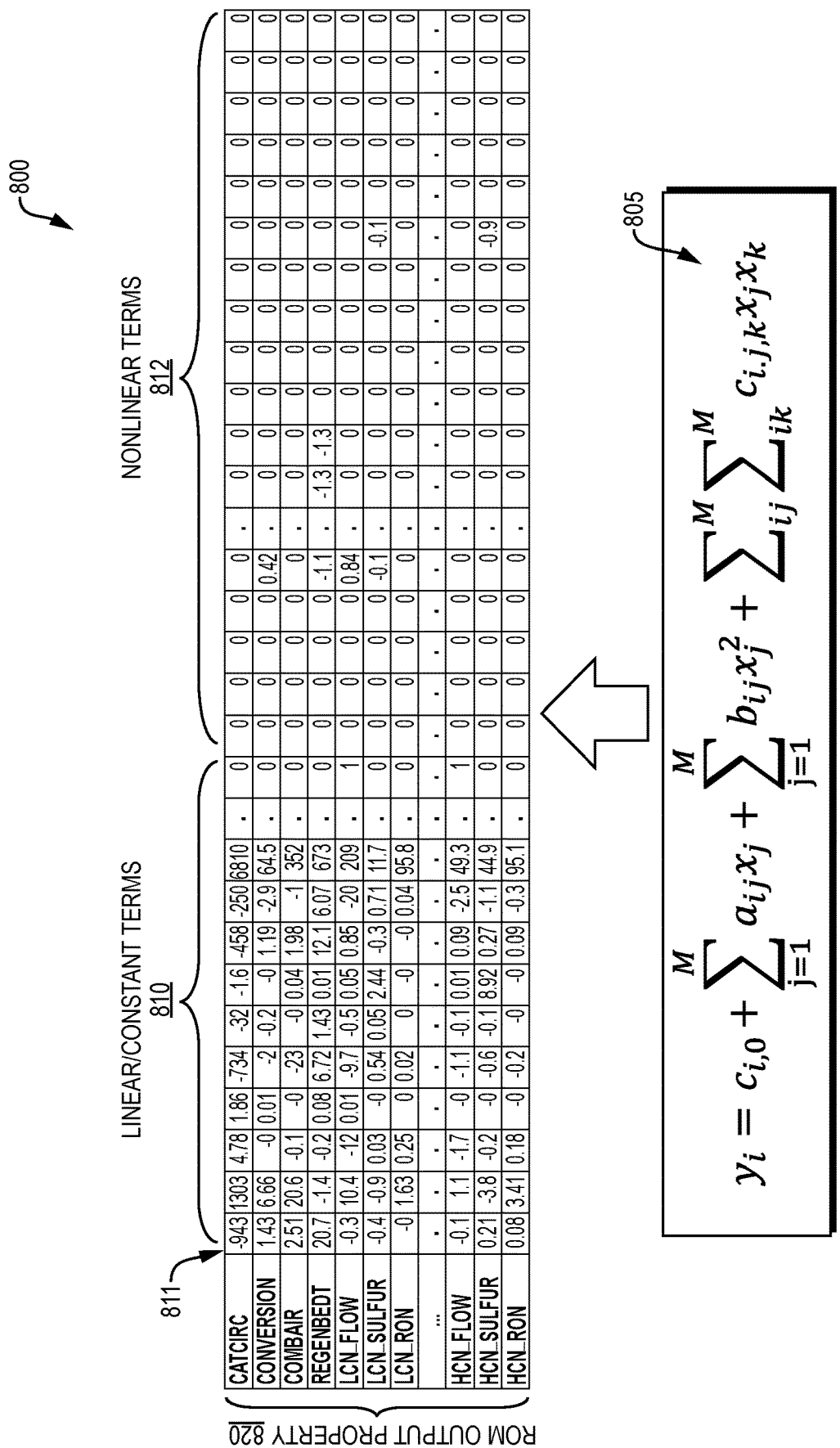
FIG. 8 depicts a tabular representation of an example ROM built from simulated data pertaining to an industrial process for which a SDROM may be built and deployed according to embodiments.

FIGS. 7A and 7B illustrate an example of simulated plant operation data from a FPM of a FCCU. FIG. 7A shows a data plot 700 in the form of a scatter plot 710 of reactor plenum catalyst temperature RTT vs. a calculated overall petrol product LCN_RON, a KPI commonly used in petroleum refining processes. FIG. 7B shows three (760, 770, and 780) of 74 available process variable simulation values for an example simulation. Multiple process dependent variable sampling values may be examined as responses corresponding to a variety of process independent variable changes under one or more operation conditions. A complete dataset generated from simulations of a FPM of the subject FCCU process may then be used by embodiments of method 200 (at step 210) to train and test an initial ROM. Method step 220 may further build a set 800 of partitioned MISO sub-models as shown in FIG. 8. Each row 820 of the table 800 represents a MISO sub-model, where the output of each MISO sub-model 820 is a process property prediction. For example, CATCIRC represents riser catalyst circulation rate, CONVERSION represents reactor yield, LCN_RON represents an estimated (calculated) total petrol product. Method step 220 may further partition each MISO sub-model 820 into a constant offset 811, a linear term of inputs 810, and a nonlinear term of inputs 812, as illustrated in FIG. 8. An equation 805 may describe the relationship between such constant 811, linear 810, and non-linear 820 terms as organized in the table 800.

Figure 9:
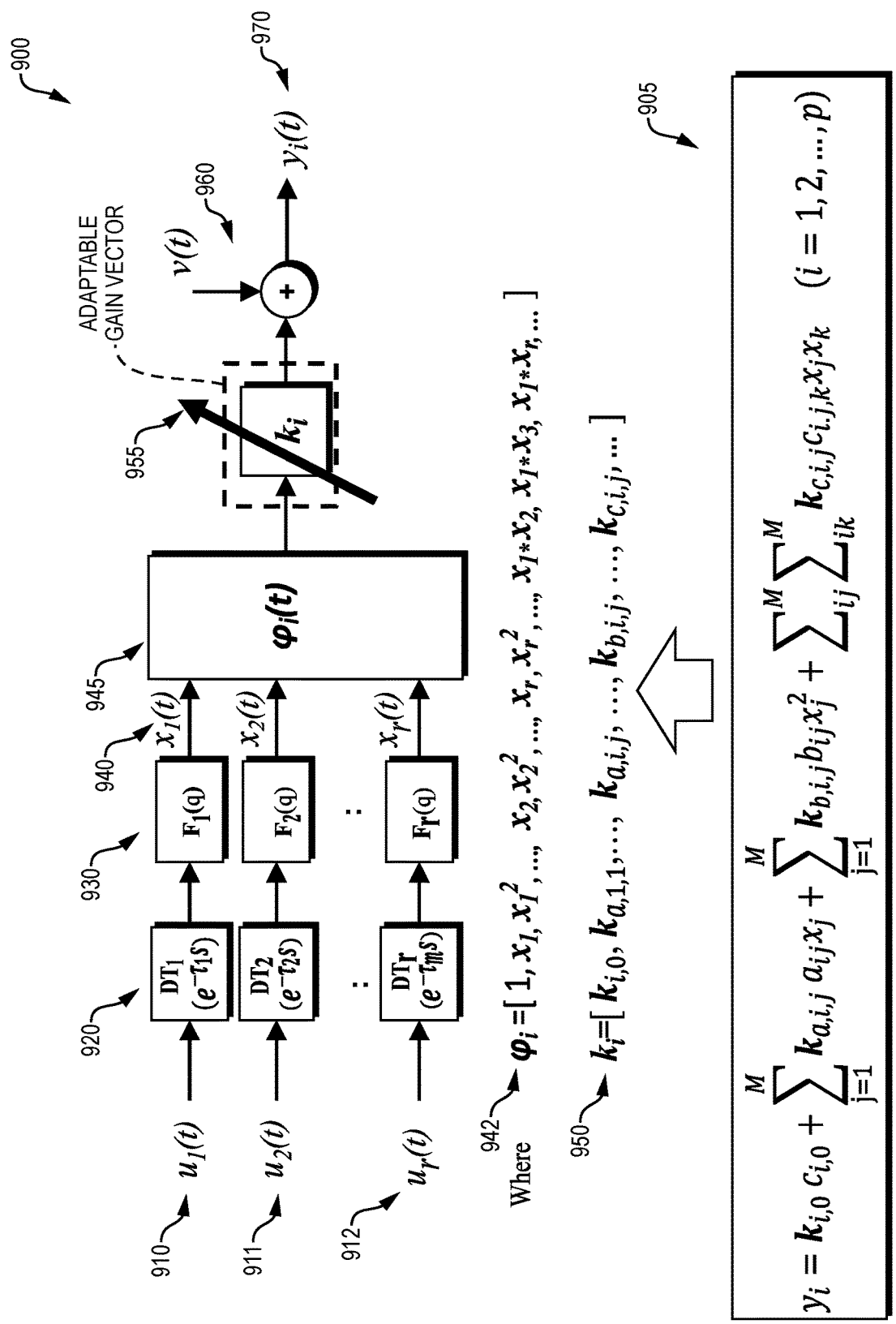
FIG. 9 is an input-output diagram of an example SDROM which may be constructed for, and deployed in, an industrial process according to embodiments.

FIG. 9 illustrates an example SDROM 900 of the subject FCCU process, as constructed by the example method 200 at step 220. For each MISO sub-model of SDROM 900, method step 220 may apply a vector of extended gain 950 as a special metric of measurement of model degradation, and adaptable gains 955 for model adaptation. Method step 220 may also attach a group of dynamic filters 930 with time-delays 920 to the inputs 910, 911, 912 of the MISO sub-models to form corresponding filtered ROM sub-models 940 to be used as inputs to the application of extended model gain 950, and subsequent adaptable 955, gains. To illustrate such application of gains 950, 955, the ROM, including the MISO sub-models, is then represented in a vector form 945. In the example shown, all filtered inputs $\{x_1(t), x_2(t), \ldots x_r(t)\}$ are used to further construct a base-vector 942 $\varphi_i(t)=[1, x_1(t), x_1^2(t), \ldots, x_2(t), x_2^2(t), \ldots, x_1(t)x_2(t), x_1(t)x_3(t), \ldots, x_1(t)x_r(t), \ldots ]$, and all inserted gain factors form an extended model gain 950 represented by vector $k_i$ in FIG. 9. Also shown in FIG. 9 is an example sub-model 905 for the ith output of the SDROM 900, as an equation. A dot product of $\varphi_i(t)$ 945 and $k_i$ 955 forms the ith submodel equation 905 of SDROM 900. When the gain vector $k_i$ 955 is adapted and deployed as shown in FIG. 9, the process input data 910, 911, 912, paired with output measurement 970, including potential variations 960, is used to calibrate the models as described hereinabove, to produce a calibrated SDROM 900.

FIGS. 10A-10C show an example of modeling process transaction dynamics with a group of linear dynamic filters and pure time-delays (i.e., dead times), wherein each filter is applied to an input-output pair to achieve an approximate "time-alignment." FIGS. 10A and 10B illustrate examples 1000a, 1000b of an input x(t) 1010a,b output y(t) 1030a,b pair, where the output y(t) 1030a,b response shows a significant time-delay 1050a,b and transaction dynamics 1040a,b to a step change 1020a,b in input x(t) 1010a,b, and the filtered data $x_f(t)$ 1010c achieves a reasonable time alignment as illustrated by the tracking of dead time 1050c and dynamic response 1040*c* from input x*f*(t) 1010*c* to output y(t) 1030*c* in example plot 1000*c* of FIG. 10C.

Figure 11B:
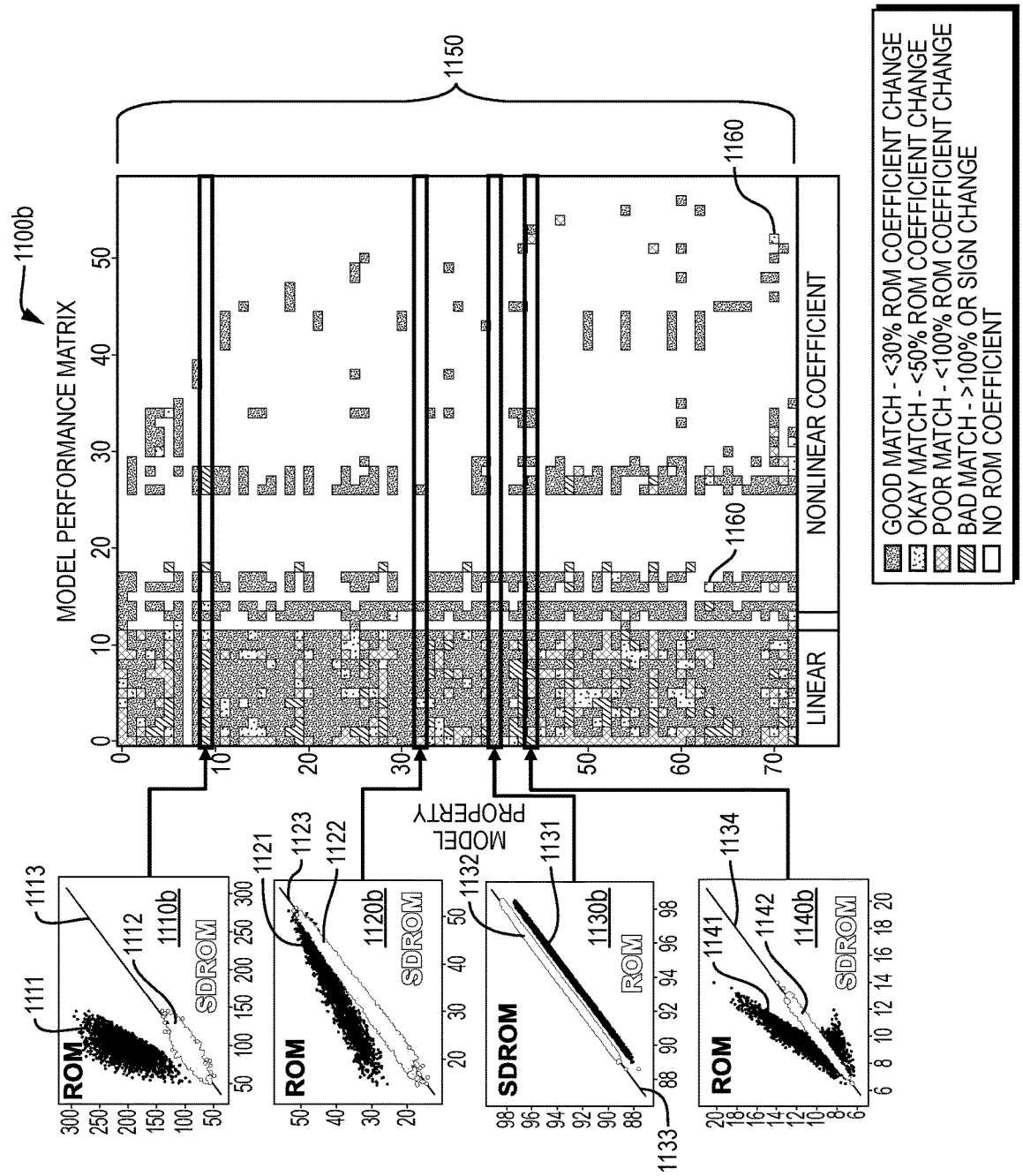
FIG. 11B is a plot showing performance results of an example SDROM deployed in an industrial process according to embodiments, with results corresponding to the selected sub-models of FIG. 11A highlighted thereupon.

FIG. 11A illustrates application results 1100*a* of an example SDROM of an industrial FCCU process. Such results 1100*a* are shown in a table of four of the 74 outputs of an example FCCU SDROM and represent example model output prediction statistics, specifically including LCN_Flow (Light cut naphthapetrol flow) 1110*a*, HCN_Paraffins (Heavy cut naphtha flow) 1120*a*, HCNLCOSWING_RON (Heavy cut naphtha/light cycle oil swing cut research octane number) 1130*a*, and HCNLCOSWING_NAPHTHENES (Heavy cut naphtha/light cycle oil swing cut naphthenes) 1140*a*. Corresponding to the results 1100*a* of FIG. 11A are results 1100*b* of FIG. 11B, where four parity plots 1110*b* illustrate prediction results of four output variables from a degraded ROM model 1111, 1121, 1131, 1141 and an adapted SDROM 1112, 1122, 1132, 1142 respectively. For example, the predicted output values from a dated ROM model 1111, 1121, 1131, 1141 are more or less a mismatch with current plant data 1113, 1123, 1133, 1143, while the output predictions from a self-adapted SDROM 1112, 1122, 1132, 1142 better track the current data 1113, 1123, 1133, 1143. The model statistics $R^2$ values are listed in table 1100*a* of FIG. 11A for the 1110*a*, 1120*a*, 1130*a*, and 1140*a* variables. Fora better display to users, all 74 outputs 1150 of the SDROM and their sub-models constructed with method 200 (steps 210, 220, 230) are illustrated in a color tile map as shown in FIG. 11B, where each row 1150 represents a MISO sub model and each color tile 1160 means a status of the sub-model performance. For example, LCN_FLOW is a sub-model at row 9, HCN_Paraffins is sub-model at row 32, HCNLCOSWING_RON is sub-model at row 40, etc. The color codes are defined as shown in the bottom of FIG. 11A, i.e. green 1171 is "good," yellow 1172 is "okay," orange 1173 is "poor," and red 1174 is "bad." Gray 1175 represents an absence of coefficient at the indicated term. With these color codes 1171-1175, users can easily learn the SDROM's overall performance by viewing the color tile map of FIG. 11B. Furthermore, users may thereby quickly identify poorly performing sub-models and allow a partial or overall model adaptation to update a SDROM in a timely manner.

Figure 11C:
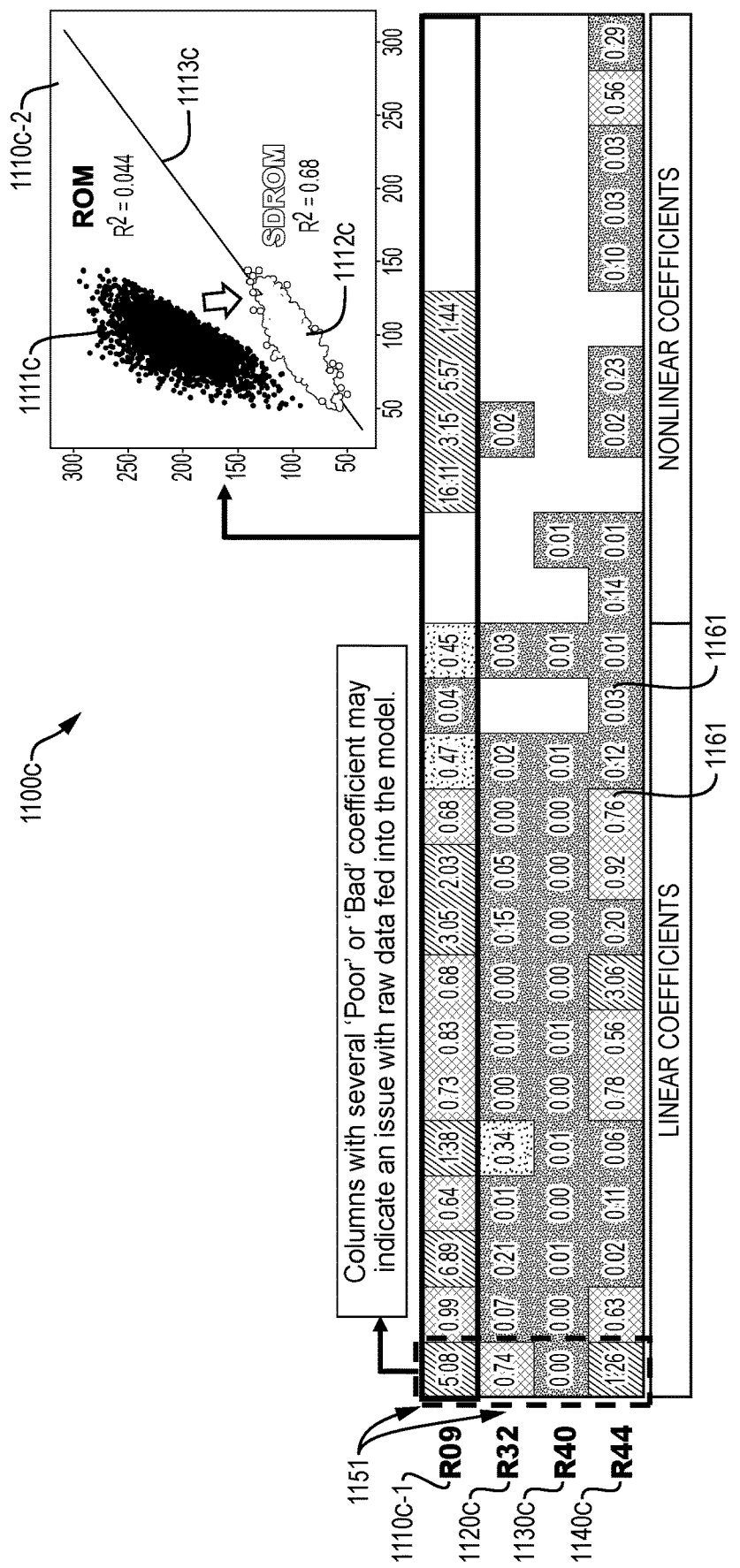
FIG. 11C is a plot showing performance results of the sub-models selected from the example SDROM of FIG. 11A, with results of a particular chosen sub-model highlighted thereupon.

FIG. 11C illustrates an additional representation 1100*c* of performance results of the four sub-models 1110*c*-1, 1120*c*, 1130*c*, 1140*c* selected for four of 74 properties of a FCCU SDROM with corresponding sub-model statistics. Each row 1151 corresponds to one of the four selected properties, and color tiles 1161 show performance results according to the color code of FIG. 11A. Parity plot 1110*c*-2 for a given selected property 1110*c*-1 shows that the adapted SDROM prediction 1112*c* better tracks current data 1113*c* than outdated ROM 1111*c*.

Advantages

Aspects of the present disclosure enable plant operators to build, deploy and run an accurate and sustainable SDROM model to achieve maximum profit margins through real-time optimization (RTO) and advanced process control (APC). In contrast, current practices and applications of plant operation optimization in process manufacturing industries often use complex FPMs, which may, if calibrated, well represent an underlying subject production process or plant. Specifically, such complex FPMs may be sufficient in terms of model responses to variations in process feed and operation conditions, such as responses in product property variations to feed crude fluctuations. However, for such FPM applications, not only is the initial implementation costly, but the sustainment of its performance over time is also challenging. The disclosed functionality provided by SDROMs facilitates the practice of model-based optimization in process manufacturing industries, and reduces the cost of a RTO implementation. As a result, SDROMs enable self-sustainment of such RTO systems. In more detail, aspects of the present disclosure provide process industrial users with the following significant advantages over existing solutions.

As a digital twin of the subject process, one or more SDROMs serve as an improved base-model to a RTO system by:

(i) providing reasonably accurate process predictions to mimic the underlying behaviors of a process or plant, with a much simpler and more manageable model structure than a full-scale FPM as used in existing solutions;

(ii) representing the underlying process in simpler input-output "causal" relationship formulas, which avoids having many cascaded internal connections with high complexity, and makes it easier to detect and identify sum-model degradations than with FPM-based existing solutions; and (iii) facilitating the calculation of real-time derivatives of one or more specified properties as model output(s) with respect to one or more specified independent model input(s), with the estimated derivatives thereby kept up to date and timely fed into to the RTO system to enable sustained performance of the RTO system.

Aspects of the present disclosure provide an innovative way of model partitioning and presenting model performance metrics that allow users to monitor and audit the performance of a ROM over time through estimation of a set of extended model gains. Once model degradation is detected, the system may start to perform online ROM adaptation to ensure that sustainable ROM continues to serve the RTO for maximum benefits, whereas in existing solutions, adaptation of a full scale FPM in industry is very difficult.

The described ROM structure with sub-model partitions provides more insightful information about model degradations, which facilitates the identification of locations of process variations and model degradations or mismatches, thereby giving the user improved functionality with which to review, assess and take early actions, in contrast with existing solutions.

Aspects of the present disclosure enable users to receive and make full use of real-time plant measurement data and avoid SSD, i.e., waiting for plant operation to reach a steady-state in order to satisfy a pre-requirement for a FPM model. As a result, the long-time window for SSD is removed by the presently disclosed solutions, enabling the RTO system to respond to process changes more rapidly than existing types of FPM-based solutions.

Aspects of the present disclosure further include a real-time ROM adaptation system, which ensures a model's consistency by using recent plant data, and provides timely updated predictions and accurate model derivatives to one or more plant operation optimizer(s). Consequently, performance of the RTO(s) can be sustained, and plant operation and production are optimized over time for maximum margins and profits.

Computer Support

Figure 12:
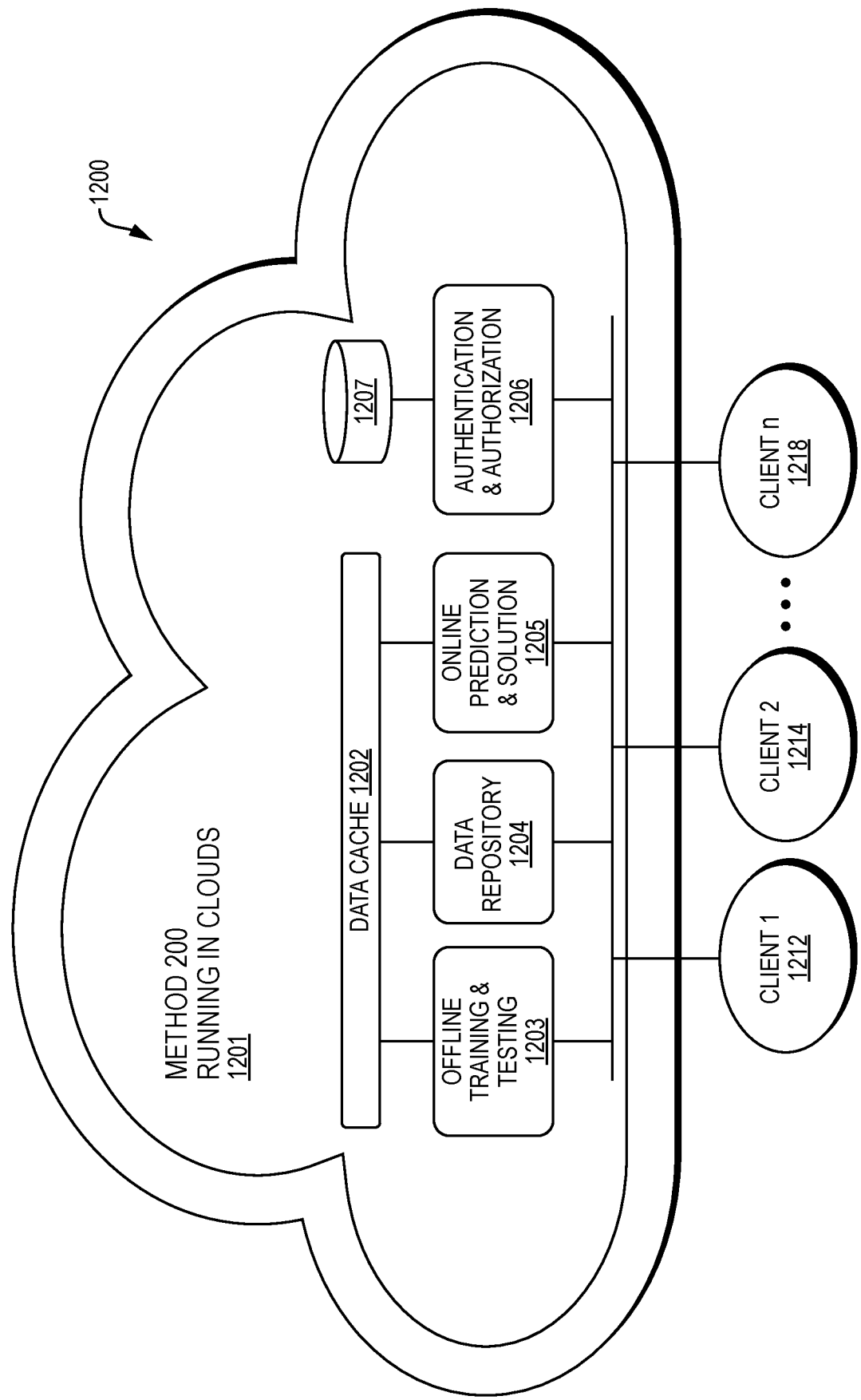
FIG. 12 is a schematic block diagram of an example system for building and deploying a SDROM for an industrial process according to embodiments.

FIG. 12 is a schematic block diagram of an example system 1200 for building and deploying a SDROM for an industrial process according to embodiments. The example system 1200 is cloud-based, with method 200 implemented in a cloud computing environment 1201. The cloud computing environment 1201 includes a data cache 1202 to support an offline training and testing module 1203, a data repository 1204, and an online prediction and solution module 1205. An authentication and authorization module 1206 interfaces with a dedicated security database 1207 to provide access to the system 1200 to clients/users such as Client 1 (1212), Client 2 (1214), and Client n (1218). In an implementation, the clients 1212, 1214, and 1218, are able to access and implement the method 200 via the cloud-computing environment 1201.

Figure 13:
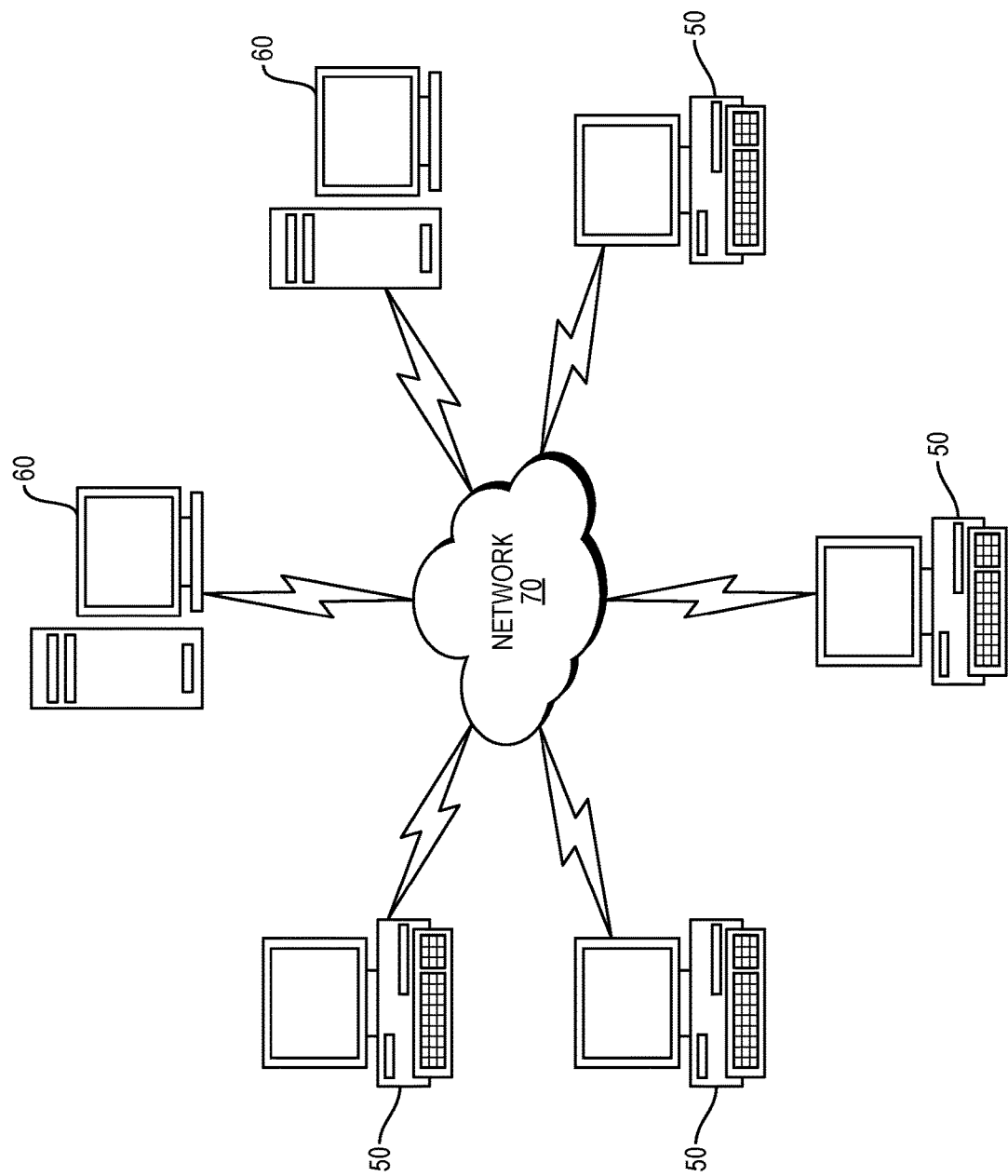
FIG. 13 illustrates a computer network or similar digital processing environment in which embodiments may be implemented.

FIG. 13 illustrates a computer network or similar digital processing environment in which embodiments of the present disclosure may be implemented. Client computer(s)/devices and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Client computers/devices 50 and/or servers 60 may be configured, alone or in combination, to implement the embodiments described herein, e.g., the method 200, amongst other examples. The server computers 60 may not be separate server computers but part of cloud network 70.

FIG. 14 is a diagram of an example internal structure of a computer (e.g., client processor/device 50 or server computers 60) in the computer system of FIG. 13. Each computer 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an input/output (I/O) device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 13). Memory 90 provides volatile storage for computer software instructions 92 and data 94 used to implement an embodiment of the present disclosure (e.g., the method 200, amongst others). Disk storage 95 provides non-volatile storage for computer software instructions 92 and data 94 used to implement an embodiment of the present disclosure. A central processor unit 84 is also attached to the system bus 79 and provides for the execution of computer instructions.

Embodiments or aspects thereof may be implemented in the form of hardware including but not limited to hardware circuitry, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, hardware, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented method of creating a model for operating a real-world industrial process, the method comprising:
   training a reduced order model (ROM) of a subject industrial process using simulation data generated from one or more simulations of the subject industrial process performed using a first-principles model (FPM) of the subject industrial process;
   constructing a sustainable dynamic reduced-order model (SDROM) of the subject industrial process by:
      (i) dividing the trained ROM into a plurality of multiple-input single output (MISO) sub-models;
      (ii) partitioning each MISO sub-model into multiple component terms; and
      (iii) inserting a gain factor into each partitioned component term to form a gain vector for each MISO sub-model; and
   deploying the SDROM online to operate the subject industrial process, wherein deploying the SDROM online includes:
      receiving a stream of real-time data of the subject industrial process; and
      determining, using the received stream of real-time data, optimal operation settings of the subject industrial process based on a predicted output and estimated local gains from the plurality of MISO sub-models.

2. The method of claim 1 wherein deploying the SDROM online includes:
   obtaining operation data of the subject industrial process; and
   periodically calibrating and validating the deployed SDROM using the obtained operation data.

3. The method of claim 2 wherein periodically calibrating and validating the deployed SDROM includes:
   monitoring a given MISO sub-model of the plurality of MISO sub-models by:
      (i) retrieving historical operation data from a plant history database;

(ii) filtering elements of the retrieved historical operation data with a dynamic filter attached to a given input of the given MISO sub-model;

(iii) wherein the gain vector formed for the given MISO sub-model is a first gain vector, estimating gain factors of a second gain vector of the given MISO sub-model based on the filtered elements of the retrieved historical operation data;

(iv) comparing the estimated gain factors of the second gain vector with inserted gain factors of the first gain vector to determine model performance metrics; and (v) displaying, to users, a visual representation of the determined model performance metrics.

4. The method of claim 2 wherein periodically calibrating and validating the constructed SDROM includes:
adapting a given MISO sub-model of the plurality of MISO sub-models of the constructed SDROM with historical operation data of the subject industrial process by:
receiving allowance to perform adaptations to at least a part of the given MISO sub-model of the constructed SDROM from a user or an auto-system; and
updating the given MISO sub-model by calibrating gain factors of the given MISO sub-model.

5. The method of claim 4 wherein:
updating the given MISO sub-model by calibrating gain factors of the given MISO sub-model includes:
retrieving the historical operation data, as a time-series, from a plant history database, for a window of time represented within the plant history database;
filtering elements of the retrieved historical operation data with a dynamic filter attached to a given input of the given MISO sub-model;
feeding the filtered elements of the retrieved historical operation data as inputs into the given MISO sub-model and predicting an output time-series corresponding to the filtered elements;
comparing the predicted output with the retrieved historical operation data of the subject industrial process output in $R^2$ statistics;
adjusting, according to the comparing, and subject to one or more suppression constraints, values of the gain factors for the given input of the given MISO sub-model, thereby calibrating the gain factors of the given MISO sub-model;
updating the SDROM to include the given MISO sub-model with the calibrated gain factors; and
validating the updated SDROM with a testing dataset.

6. The method of claim 1 wherein deploying the SDROM online further includes:
filtering elements of the received stream of real-time data with a dynamic filter attached to a given input of a given MISO sub-model; and
predicting an output of the given MISO sub-model and estimating local gains of the given MISO sub-model around an updated operating point determined from the filtered elements of the received stream of real-time data.

7. The method of claim 1 wherein deploying the SDROM online includes:
determining the optimal operation settings of the subject industrial process using the SDROM and an optimization objective function, the optimal operation settings including at least one of a temperature setpoint, a pressure setpoint, a flow rate setpoint, an operating throughput, and a transition path from a current operating state to the determined optimal operation settings; and
operating the subject industrial process in accordance with the determined optimal operation settings.

8. The method of claim 1 wherein constructing the SDROM further includes:
attaching respective dynamic filters to inputs of each MISO sub-model to align, with respect to time, input data.

9. The method of claim 8 wherein attaching respective dynamic filters to inputs of each MISO sub-model includes at least one of:
obtaining at least one of the respective dynamic filters from a dynamic finite impulse response (FIR) model by use of a linear model order reduction technique; and
obtaining at least one of the respective dynamic filters from input-output time-series data of the subject industrial process by use of a subspace identification technique.

10. The method of claim 1 wherein training the ROM of the subject industrial process includes:
dividing the generated simulation data into a training dataset and a testing dataset;
establishing the ROM by fitting the training dataset to a polynomial-based implementation of the FPM with polynomials of a $2^{nd}$, or higher, order; and
validating the established ROM with the testing dataset.

11. The method of claim 1 wherein training the ROM further includes at least one of:
configuring the FPM of the subject industrial process based on at least one of: (i) a flowsheet of the subject industrial process, (ii) a design of the subject industrial process, and (iii) operational parameters of the subject industrial process; and
generating the generated simulation data by performing the one or more simulations with variable values encompassing input variations and historical operation of the subject industrial process.

12. The method of claim 11 wherein configuring the FPM of the subject industrial process includes at least one of:
building one or more simulation blocks and connections, according to the flowsheet of the subject industrial process; and
configuring one or more designs of the subject industrial process, or operational parameters of the subject industrial process, in a given simulation of the one or more simulations.

13. The method of claim 11 wherein generating the generated simulation data by performing the one or more simulations includes:
running multiple simulations of the subject industrial process based on a plurality of combinations of input values and operating conditions; and
recording simulation output data from the multiple simulations as the generated simulation data.

14. A computer-based system for creating a model for operating a real-world industrial process, the system comprising:
a processor; and
a memory with computer code instructions stored thereon, the processor and the memory, with the computer code instructions, being configured to cause the system to:
train a reduced order model (ROM) of a subject industrial process using simulation data generated from one or more simulations of the subject industrial process performed using a first-principles model (FPM) of the subject industrial process;

construct a sustainable dynamic reduced-order model (SDROM) of the subject industrial process by:
(i) dividing the trained ROM into a plurality of multiple-input single-output (MISO) sub-models;
(ii) partitioning each MISO sub-model into multiple component terms; and
(iii) inserting a gain factor into each partitioned component term to form a gain vector for each MISO sub-model; and deploy the SDROM online to operate the subject industrial process,
wherein deploying the SDROM online includes:
receiving a stream of real-time data of the subject industrial process; and
determining, using the received stream of real-time data, optimal operation settings of the subject industrial process based on a predicted output and estimated local gains from the plurality of MISO sub-models.

15. The system of claim 14 wherein, in deploying the SDROM online, the processor and the memory, with the computer code instructions, are further configured to cause the system to:
obtain operation data of the subject industrial process; and
monitor a given MISO sub-model of the plurality of MISO sub-models by:
(i) retrieving historical operation data from a plant history database;
(ii) filtering elements of the retrieved historical operation data with a dynamic filter attached to a given input of the given MISO sub-model;
(iii) wherein the gain vector formed for the given MISO sub-model is a first gain vector, estimating gain factors of a second gain vector of the given MISO sub-model based on the filtered elements of the retrieved historical operation data;
(iv) comparing the estimated gain factors of the second gain vector with inserted gain factors of the first gain vector to determine model performance metrics; and
(v) displaying, to users, a visual representation of the determined model performance metrics.

16. The system of claim 14 wherein, in deploying the SDROM online, the processor and the memory, with the computer code instructions, are further configured to cause the system to:
adapt a given MISO sub-model of the plurality of MISO sub-models of the constructed SDROM with historical operation data of the subject industrial process by:
receiving allowance to perform adaptations to at least a part of the given MISO sub-model of the constructed SDROM from a user or an auto-system; and
updating the given MISO sub-model by calibrating gain factors of the given MISO sub-model.

17. The system of claim 16 wherein, in updating the given MISO sub-model by calibrating gain factors of the given MISO sub-model, the processor and the memory, with the computer code instructions, are further configured to cause the system to:
retrieve the historical operation data, as a time-series, from a plant history database, for a window of time represented within the plant history database;
filter elements of the retrieved historical operation data with a dynamic filter attached to a given input of the given MISO sub-model;
feed the filtered elements of the retrieved historical operation data as inputs into the given MISO sub-model and predict an output time-series corresponding to the filtered elements;
compare the predicted output with the retrieved historical operation data of the subject industrial process in $R^2$ statistics;
adjust, according to the comparing, and subject to one or more suppression constraints, values of the gain factors for the given input of the given MISO sub-model, thereby calibrating the gain factors of the given MISO sub-model;
update the SDROM to include the given MISO sub-model with the calibrated gain factors; and
validate the updated SDROM with the testing dataset.

18. The system of claim 14 wherein, in deploying the SDROM online, the processor and the memory, with the computer code instructions, are further configured to cause the system to:
filter elements of the received stream of real-time data with a dynamic filter attached to a given input of a given MISO sub-model; and
predict an output of the given MISO sub-model and estimate local gains of the given MISO sub-model around an updated operating point determined from the filtered elements of the received stream of real-time data.

19. The system of claim 14 wherein, in deploying the SDROM online, the processor and the memory, with the computer code instructions, are further configured to cause the system to:
determine the optimal operation settings of the subject industrial process using the SDROM and an optimization objective function, the optimal operation settings including at least one of a temperature setpoint, a pressure setpoint, a flow rate setpoint, an operating throughput, and a transition path from a current operating state to the determined optimal operation settings; and
operate the subject industrial process in accordance with the determined optimal operation settings.

20. A computer program product for creating a model for operating a real-world industrial process, the computer program product comprising:
a non-transitory computer-readable medium having computer-readable program instructions stored thereon, the instructions, when executed by a processor, causing the processor to:
train a reduced order model (ROM) of a subject industrial process using simulation data generated from one or more simulations of the subject industrial process performed using a first-principles model (FPM) of the subject industrial process;
construct a sustainable dynamic reduced-order model (SDROM) of the subject industrial process by:
(i) dividing the trained ROM into a plurality of multiple-input single-output (MISO) sub-models;
(ii) partitioning each MISO sub-model into multiple component terms; and
(iii) inserting a gain factor into each partitioned component term to form a gain vector for each MISO sub-model; and
deploy the SDROM online to operate the subject industrial process, wherein deploying the SDROM online includes:
receiving a stream of real-time data of the subject industrial process; and determining, using the received stream of real-time data, optimal operation settings of the subject industrial process based on a predicted output and estimated local gains determining optimal operation settings of the subject industrial process based on a predicted output and estimated local gains from the plurality of MISO sub-models.

\* \* \* \* \*